(12) United States Patent
Merkoulovitch et al.

(10) Patent No.: US 7,392,213 B2
(45) Date of Patent: Jun. 24, 2008

(54) GENERATOR LIBRARIES

(75) Inventors: Leonid Merkoulovitch, Toronto (CA);
Dan Rosen, Toronto (CA)

(73) Assignee: Algorithmics Software LLC,
Wilmington, DE (US)

( * ) Notice: Subject to any disclaimer, the term of this patent is extended or adjusted under 35 U.S.C. 154(b) by 1411 days.

(21) Appl. No.: 10/084,650

(22) Filed: Feb. 28, 2002

(65) Prior Publication Data

US 2003/0101122 A1 May 29, 2003

Related U.S. Application Data

(60) Provisional application No. 60/331,732, filed on Nov. 21, 2001.

(51) Int. Cl.
*G06Q 40/00* (2006.01)
*G06F 9/44* (2006.01)

(52) U.S. Cl. ....................... 705/36 R; 717/104; 717/108

(58) Field of Classification Search ............... 705/36 R; 717/104, 108
See application file for complete search history.

(56) References Cited

U.S. PATENT DOCUMENTS

| | | | |
|---|---|---|---|
| 6,709,330 B1* | 3/2004 | Klein et al. ..................... 463/9 |
| 7,228,290 B2* | 6/2007 | Browne et al. ............. 705/36 R |
| 2001/0011243 A1 | 8/2001 | Dembo et al. |
| 2001/0025264 A1 | 9/2001 | Deaddio et al. |
| 2003/0014356 A1* | 1/2003 | Browne et al. ................. 705/38 |

OTHER PUBLICATIONS

Ron S. Dembo, Andrew R. Aziz, Dan Rosen, and Michael Zerbs, Mark to Future, May 2000, Algorithmics Incorporated, pp. 39 and 40.*
Microsoft Excel 2000 Bible Quick Start, 1999, Wiley Publishing, Inc., pp. 651-652.*
Robert Lafore, The Waite Group's Microsoft C Programming for the PC, 1989, The Waite Group, Inc., Second Edition, pp. 3, and 567-569.*
James Rumbaugh et al., Object-Oriented Modeling and Design, Nov. 14, 1990, Prentice Hall, Inc., pp. 1-10.*

(Continued)

*Primary Examiner*—James P. Trammell
*Assistant Examiner*—Scott Trotter
(74) *Attorney, Agent, or Firm*—Bereskin & Parr

(57) ABSTRACT

The present invention is directed to a generic, object-oriented library of generators and operations on generators. The library of generators and other objects provides a set of reusable components that can be used in the development of other components required for new risk management generation models. Using basic simple objects predefined in the library and the operations on these objects, complicated objects required for a new risk management generation models may be built more efficiently and easily. In one aspect of the present invention, there is provided a generator for use in developing risk management software, where the generator produces elements of a sequence governed by a sequential process, where the generator comprises a common generator interface, and where the common generator interface comprises a first function that generates the next element of the sequence, and a second function that returns the element most recently generated by the first function, and where the generator can participate with at least one other operand in an expression to produce a second generator.

12 Claims, 19 Drawing Sheets

OTHER PUBLICATIONS

Unknown, The Penguin English Dictionary, 2000, Penguin Books.*

Art Conroy, An object-oriented approach to test data generation, May 1995, Enterprise Systems Journal, vol. 10, pp. 64-66.*

Jamshidian and Zhu, Scenario Simulation Theory and Methodology, Finance and Stochastics, 4(1): 43-67 (1997).

Kreinin et al., Measuring Portfolio Risk Using Quasi Monte Carlo Methods, Algo Research Quarterly, 1(1): 17-25 (1998).

Kreinin et al., Principal Component Analysis in Quasi Monte Carlo Simulation, Algo Research Quaterly, 1(2): 21-29 (1998).

Merkoulovitch, Leonid, "GenLib: Introduction to Generators", Algo Research Quarterly vol. 4, No. 3, 37-55, Sep. 2001.

* cited by examiner

```
for (int i=0; i<n; ++i) {
    if (gen) {                      // Generator is not exhausted
        cout << "Element # " << i << ", "
             << "Generated value: " << *gen << "; "
             << "Weight: " << gen.getWeight() << "; "
             << "Accumulated Weight: " << gen.getAccumWeight() << endl
             ;
        ++gen;
    } else {
        cout << "The generator is exhausted. You may try to reset it."
             << endl
             ;
        break;
    }
}
```

```
A    GLVectorGen glStdUnifSampVectGen(
     int dim, const GLNumberGen& rn_gen
     )
     {
     return glSequentialVectorGen(dim, rn_gen);
     }

B    GLGen<X> glRndMixtureGen(
     const GLArray<GLGen<X>>& gens, const GLVector& probs,
     const GLNumberGen& rn_gen
     )
     {
     return glMixGen<X>(
         gens, glStdDiscreteSampleGen(probs, rn_gen)
         );
     }

C    GLNumberGen glNormalMixtureGen(
     double mean, double std_dev1, double std_dev2,
     double p, const GLNumberGen& rn_gen
     )
     {
     GLArray<GLNumberGen> gens(2);
     gens(0) = glNormalGen(mean, st_dev1, rn_gen);
     gens(1) = glNormalGen(mean, st_dev2, rn_gen);
     GLVector probs(2); probs(0) = p; probs(1) = 1 - p;
     return glRndMixtureGen(gens, probs, rn_gen);
     }
```

```
GLVector x;
for (int i=0; i<100; ++i) {
    cout << "Input a vector: ";
    cin >> x;
    cout << "The image of the vector is " << m(x) << endl
}
```

FIG. 7

```
A   GLNumberGen glStdNormSampGen(const GLNumberGen& rn_gen)
    {
      return glSampleFromCdfGen(GLStdNormalCdf(), rn_gen);
    }

B   GLVectorGen glMultivarStdNormalSampleGen(
    int dim, const GLNumberGen& rn_gen
    )
    {
      return glSequentialVectorGen(dim, glStdNormSampGen(rn_gen));
    };

C   GLVectorGen glMultivarNormalSampleGen(
    const GLMatrix& A, const GLNumberGen& rn_gen
    )
    {
      return glLinearMap(A)
        << glMultivarStdNormalSampleGen(A.cols(), rn_gen)
    }
```

```
A   GLNumberGen glSampleFromCdfGen(
        const GLCdf& cdf, const GLNumberGen& rn_gen
    {
        return glInvertedMap(cdf) << rn_gen;
    }

B   GLVectorGen glMultivarSampleFromCdfGen(
        const GLCdf& cdf, const GLVectorGen& unif_gen
    {
        return glExtensionToVectorMap(
            glInvertedMap(cdf)
        ) << unif_gen;
    }
```

```
GLVectorGen getGeneralizedNormalGen(Interface& iface)
{
    switch (iface.getGenerationSchema()) {
    case PSEUDO_RANDOM_SAMPLING:
        int dim = iface.getDim();
        long seed = iface.getSeed();
        return glMultivarStdNormalSampleGen(dim, glRnGen(seed));
    case LOW_DISCREPANCY_SEQUENCE:
        int dim = iface.getDim();
        return glVectSampleFromCdfGen(
            glStdNormalCdf(0,1), glSobolSequenceGen(dim)
        );
    case STRATIFIED_SAMPLING:
        GLintVector num_nodes = iface.getJamshidianNumNodes();
        return glJamshidianMultivarDistribGen(num_nodes);
    }
}
```

FIG. 13

```
GLVectorGen getLogNormalScenarioGen(Interface& iface)
{
    GLVector x0 = iface.getInitValue();
    GLMatrix A = iface.getTransformationMatrix();
    double dt = iface.getTimeStep();
    return x0 * glExtensionToVectorMap(glFromFuncPointerMap(exp))
        << glLinearMap(A*sqrt(dt))
        << getGeneralizedNormalGen(iface)
        ;
}
```

FIG. 14

```
A    GLNumberGen getInstrumentSimulationGen(
     const GLGen<GLVector>& sc_gen, const GLFunc& pr_map
     )
     {
        return pr_map << sc_gen;
     }

B    GLVectorGen getByInstrumentPortfolioSimulationGen(
     const GLVectorGen& sc_gen,
     const GLArray<GLFunc>& pr_map_arr
     )
     {
        return glScalarMergeMap<GLVector, double>(pr_map_arr)
               << sc_gen;
     }

C    GLNumberGen getPortfolioSimulationGen(
     const GLVectorGen& sc_gen,
     const GLArray<GLFunc>& pr_map_arr, const GLVector& positions
     )
     {
        return product(
            positions, glScalarMergeMap<GLVector, double>(pr_map_arr)
        ) << sc_gen;
     }
```

```
13a   GLVectorGen pr_gen = getByInstrumentPortfolioSimulationGen(
         getLogNormalScenarioGen(iface), pr_map_arr
      );

B     GLMatrix mtf(num_scen, num_instr);
      for (i=0; i<num_scen; ++i) {
         for (j=0; j<num_instr; ++j) {
            mtf[i,j] = (*pr_gen)[j];
         }
         ++pr_gen;
      }
```

FIG. 16

GENERATOR LIBRARIES

FIELD OF THE INVENTION

The present invention relates generally to financial risk management software, and more specifically, to software components used in object-oriented financial risk management software development.

BACKGROUND OF THE INVENTION

A wide variety of problems that arise in financial risk management deal with various types of sequential processes. For instance, the accumulation of historical data and the calculation of relevant statistical measures typically proceed on a daily basis. Similarly, generating historical or Monte Carlo scenarios, and simulating portfolios of financial instruments over these scenarios are tasks of a repetitive nature. As another example, calibrating financial models may involve iterative algorithms that obtain successively better approximations.

Over the last several years, both the sequential processes and the risk management models that use them have become much more diverse and sophisticated. Today's financial market conditions demand the fast and efficient implementation of flexible computer applications that support a wide variety of options, including the run-time construction of complex models from diverse components. This introduces a new level of requirements for generality and flexibility of the software supporting such applications.

In many prior art risk management systems, each software component implementing a particular process for scenario or price generation is developed separately. Consequently, the level of reusability and flexibility of software components is low, and the development of software components for new models can be labor-intensive and expensive.

Accordingly, there is a need for a means to provide a sufficient set of reusable software components that can be used in the development of other components required for new risk management generation models.

SUMMARY OF THE INVENTION

The present invention is directed to a generic, object-oriented library of generators and operations on generators. The library of generators provides a set of reusable components that can be used in the development of other components required for new risk management generation models. Using basic simple objects predefined in the library and the operations on these objects, complicated objects required for a new risk management generation models may be built more efficiently and easily.

The generator is the central concept that underlies the library for developing software applications developed in accordance with the present invention. In an abstract sense, a generator represents an arbitrary sequential process. Functionally, in one embodiment of the present invention, it is a C++ object that produces a sequence of elements, which might represent scenarios or prices of financial instruments, for example.

Generators can be passed to various application components and provide data on demand, thereby eliminating the need for maintaining large files of data. A common generator interface allows applications to use all generators in a consistent manner, without regard for their underlying nature. This independence of applications and generators enables the development of general and flexible application components.

By means of a comprehensive set of operations, generators and other library objects (e.g., maps) can be combined to produce new generators of increasing complexity. In particular, the availability of these operations in the library can allow for the run-time construction of these generators.

Generators and generator operations allow for the efficient construction of a set of components for performing scenario generation and simulation. The present invention can be applied in applications requiring complex features such as the generation of multi-step scenarios or scenarios with a tree-like structure, the pricing of path-dependent instruments or portfolios with multiple levels of underlying instruments, and the calculation of exposures and losses for credit risk, for example.

In one aspect of the present invention, there is provided a generator for use in developing risk management software, wherein the generator produces elements of a sequence governed by a sequential process, the generator comprising a common generator interface, the common generator interface comprising: a first function that generates the next element of the sequence; and a second function that returns the element most recently generated by the first function; where the generator can participate with at least one other operand in an expression to produce a second generator.

In another aspect of the present invention, there is provided a system for use in developing risk management software, a system comprising a plurality of generators; at least one of a plurality of maps and a plurality of accumulators; and a plurality of operations, the plurality of operations defined to operate on at least one generator of the plurality of generators and at least one other operand in an expression to produce a new generator.

In another aspect of the present invention, there is provided a method of simulating a portfolio of financial instruments over a plurality of scenarios, the method comprising the steps of constructing a scenario generator; constructing one or more pricing maps, each pricing map associated with an instrument in a portfolio; composing the one or more pricing maps with the scenario generator to obtain a pricing generator; and using the pricing generator in performing a simulation to obtain prices for a plurality of instruments.

In another aspect of the present invention, there is provided a method of simulating a portfolio of financial instruments over a plurality of scenarios, the method comprising the steps of: constructing a stochastic sequence generator; constructing one or more pricing accumulators, each pricing accumulator associated with an instrument in a portfolio; composing the one or more pricing accumulator with the stochastic sequence generator to obtain a pricing generator; using the pricing generator in performing a simulation to obtain prices for a plurality of instruments at each time step in a scenario; and repeating the simulation over a plurality of scenarios.

BRIEF DESCRIPTION OF THE DRAWINGS

For a better understanding of the present invention, and to show more clearly how it may be carried into effect, reference will now be made, by way of example, to the accompanying drawings which show preferred embodiments of the present invention, and in which:

FIG. 3 illustrates a sample block of code that demonstrates the usage of a common generator interface;

FIG. 6 illustrates sample blocks of code implementing different constructing functions for operations on generators;

FIG. 7 illustrates a sample block of code implementing a common map interface;

FIG. 9 illustrates sample blocks of code implementing different constructing functions for constructing patterns;

FIG. 11 illustrates sample blocks of code implementing different constructing functions for the composition of a map and a generator;

FIG. 13 illustrates a sample block of code implementing a constructing function for a generalized normal sequence generator;

FIG. 14 illustrates a sample block of code implementing a constructing function for a generator of scenarios;

FIG. 15 illustrates sample blocks of code implementing constructing functions for pricing generators;

FIG. 16 illustrates sample blocks of code used to create a pricing generator and to populate a Mark-to-Future table;

DESCRIPTION OF PREFERRED EMBODIMENTS OF THE INVENTION

Figure 1:
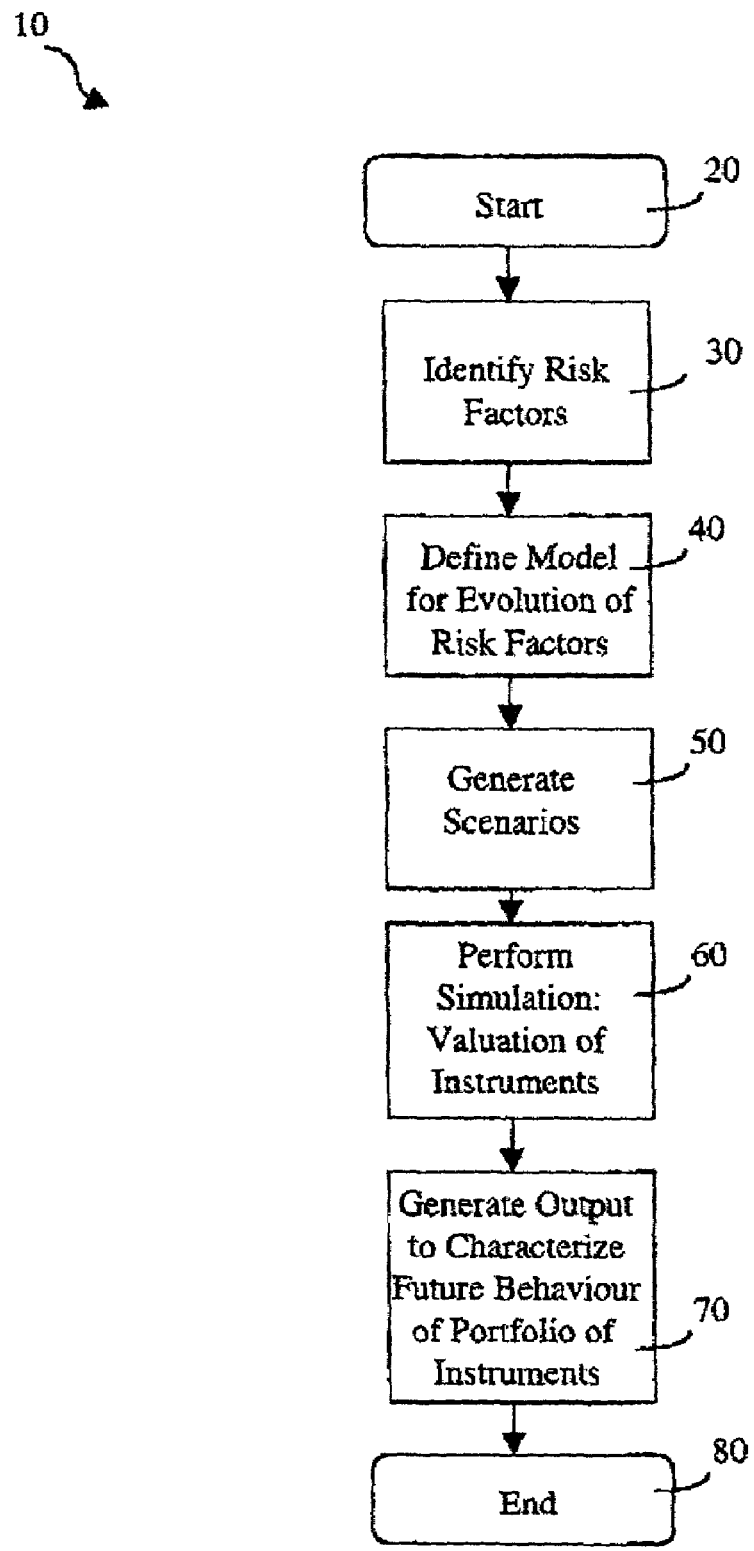
FIG. 1 is a flowchart illustrating the steps in a typical method of portfolio simulation.

In a preferred embodiment of the present invention, the invention relates to a generic, object-oriented C++ library. In the implementation of this embodiment of the present invention described in detail herein, this library is referred to as GenLib™ (Generator Library), a library developed in response to the requirements of typical modern financial risk management applications.

The main concept underlying GenLib is that of a generator—an abstract representation of an arbitrary sequential process. This abstraction, defined in the library as a key base class, provides a set of methods that encompass the concept of a generator. All concrete generators (i.e., actual generator objects) are specific instances of this class. A given concrete generator produces a sequence of elements of a certain type (e.g., real numbers or objects of other, possibly much more complex, types). Many processes which arise in financial risk management problems (e.g., different types of processes may include the accumulation of historical data, the calculation of statistical measures, the generation of historical scenarios, the generation of Monte Carlo scenarios, the simulation of portfolios of financial instruments over such scenarios, the calibration of financial models, etc.) can be represented as concrete generators. The library provides a comprehensive and flexible set of tools for the run-time creation of concrete generators as required by risk management applications.

Once a generator is created for a specified process, it can be passed to an application component and used for generating data according to this process. Because the call interface is identical for all generators, the application is not required to know anything about the original nature (i.e., the underlying process) of the generator. This enables the creation of very general and robust application components.

Generators can be easily and naturally combined with each other as well as with other library objects to produce new, more complex, generators that, in turn, can be used for further constructions. The consistent development of this feature leads to a comprehensive, powerful and flexible set of operations that forms a natural algebra of generators. This algebra enables applications to construct new types of generators based on the generators and other objects that are already available in the library.

Based on the generator algebra, GenLib defines a set of comprehensive frameworks for major risk management problems, including for example, accumulation of historical data, scenario generation, valuation of financial instruments, and portfolio stress testing. These frameworks, defined in terms of general GenLib abstractions, provide a strong direction for developing specific components in the library. Furthermore, the frameworks promote general and consistent solutions for the applications that are built based on GenLib. Thus, the approach ensures the development of general, consistent, reusable, reliable and efficient software components and, as a result, reduces the time and cost for software development, maintenance and support.

Although GenLib contains a wide variety of pre-defined concrete generators that are readily available to users, it is not the purpose of the library to implement every possible generator that might potentially be required by applications; this would be neither realistic nor efficient. Instead, the library provides comprehensive and flexible tools for creating new generators based on the generators and other objects that have already been defined. Examples of operations on generators and other objects that form the generator algebra are described in further detail below.

Simulation Approach for Portfolio Risk Management

GenLib is a tool for developing software components that can be used, for example, to implement a simulation approach for portfolio risk management. In this section, the basics of this approach are discussed.

Given a portfolio of financial instruments at some current time $t_0$, suppose it is desired to simulate the behaviour of the portfolio (e.g., tho prices of the portfolio instruments) at a set of future time points $t_1, t_2, \ldots, t_n$. It is assumed that a pricing function for each instrument in the portfolio is available. A pricing function for an instrument calculates the value of the instrument at some time t depending on the values of a set of market variables. Market variables can include, for example: risk factors such as interest rates, foreign exchange rates, market indices, and commodity prices, for example; values of underlying instruments; or statistics calculated based on other market variables.

Referring to FIG. 1, the steps in a typical method of portfolio simulation in accordance with an embodiment of the present invention are illustrated generally as 10. The method commences at step 20.

At step 30, a set of risk factors that affect the prices of instruments in the portfolio is identified. This set consists of all risk factors that appear in the pricing functions of the portfolio's instruments. In practice, financial institutions may have portfolios containing tens of thousands of instruments that typically depend on hundreds (or in the case of credit risk, hundreds of thousands) of risk factors.

At step 40, an underlying, usually stochastic, model for the joint evolution of the risk factors over time is defined (in a single-step model, it is sufficient to specify a probability distribution over the set of risk factors at the simulation time t). This model is referred to as a scenario-generation model and should reflect the individual behaviour of the risk factors as well as their interdependencies. The particular realizations of the model (i.e., the actual paths of risk factor values over time, obtained according to the model) are called scenarios.

At step 50, the scenario-generation model is used to generate a certain number of scenarios, collectively known as a scenario set. The number of scenarios must be large enough to provide an acceptable statistical representation of the model. In practice, scenario sets typically contain thousands of scenarios.

At step 60, a simulation to obtain prices of instruments in a portfolio is performed. The instrument pricing functions are used to value each instrument in each scenario at every time point. The resulting set of instrument values can be used to populate a three-dimensional Mark-to-Future (MtF) Cube. Further details on the Mark-to-Future Cube can be found in Dembo et al., *Mark-to-Future: A Framework for Measuring Risk and Reward*, Toronto: Algorithmics Publications (2000), the contents of which are herein incorporated by reference.

Mark-to-Future Methodology

Figure 2A:
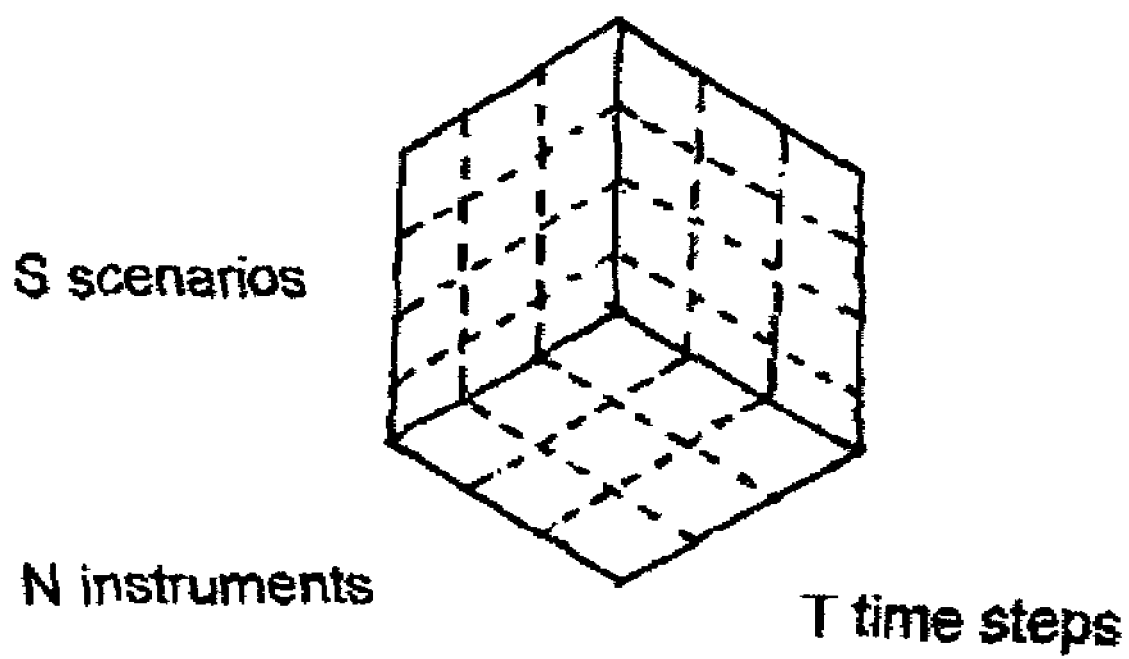
FIG. 2A is a diagram illustrating an example of a Mark-to-Future (MtF) cube.

The three-dimensional MtF Cube is at the core of the MtF framework. The MtF Cube is built in steps. First, a set of scenarios is chosen. A scenario is a complete description of the evolution of key risk factors over time. In the second step, a MtF table is generated for a given financial instrument. Each cell of the MtF table contains the computed MtF value for that financial instrument under a given scenario at a specified time step. A MtF Cube consists of a set of MtF tables, one for each financial instrument of interest. FIG. 2A illustrates an example of a MtF Cube. In certain applications, a cell of the MtF Cube may contain other measures in addition to its MtF value, such as an instrument's MtF delta or MtF duration. In the general case, each cell of a MtF Cube contains a vector of risk-factor dependent measures for a given instrument under a given scenario and time step. In some applications, the vector may also contain a set of risk-factor dependent MtF cash flows for each scenario and time step.

Key to the MtF framework is the premise that knowledge of portfolio holdings is not required to generate a MtF Cube: a single MtF Cube accommodates the risk/reward assessment of multiple portfolios simultaneously. A MtF Cube provides a pre-computed basis that maps into all portfolios of financial products. Since the MtF Cube contains all of the necessary information about the values of individual instruments, a portfolio MtF table can be created simply as a combination of those basis instruments. All risk/reward analyses and portfolio dynamics for any set of holdings are, therefore, derived by post-processing the contents of the MtF Cube. For example, the risk/reward assessment of a portfolio regime such as a roll-over strategy or an immunization strategy is captured strictly through the mapping of the MtF Cube into dynamically rebalanced positions.

The MtF methodology for risk/reward assessment can be summarized by the following six steps, each of which can be explicitly configured as an independent component of the overall process:

The first three steps build the MtF Cube:
1. Define the scenario paths and time steps.
2. Define the basis instruments.
3. Simulate the instruments over scenarios and time steps to generate a MtF Cube.

The next three steps apply the MtF Cube:
4. Map the MtF Cube into portfolios to produce a portfolio MtF table.
5. Aggregate across dimensions of the portfolio MtF table to produce risk/reward measures.
6. Incorporate portfolio MtF tables into advanced applications.

Figure 2B:
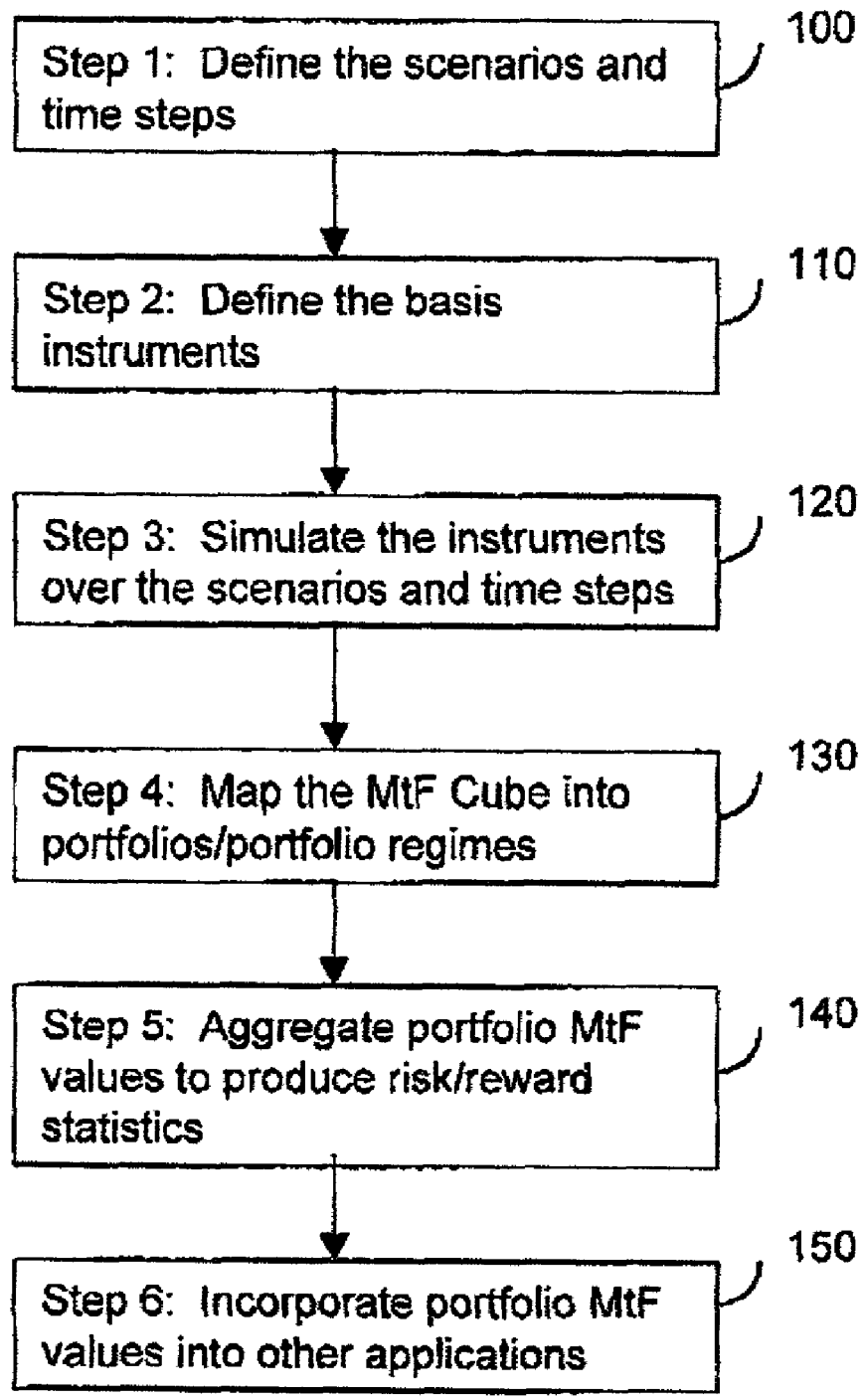
FIG. 2B is a flowchart illustrating the steps in a MtF methodology.

The simulation of the MtF Cube in Steps 1 to 3 above represents a computationally intensive stage of the process and need be performed only once. These steps represent the pre-Cube stage of MtF processing. In contrast, Steps 4 to 6 represent post-processing exercises, which can be performed with minimal additional processing (Step 4 and Step 5) or slightly more complex processing (Step 6). These steps represent the post-Cube stage of MtF processing. FIG. 2B provides a flowchart illustrating the six steps of the MtF methodology, explained in further detail below.

The decoupling of the post-Cube stage from the pre-Cube stage is a key architectural benefit of the Mark-to-Future framework. A single risk service may generate a MtF Cube (pre-Cube) that can be distributed to multiple risk clients (post-Cube) for a variety of customized business applications. This generates leverage as a common risk/reward framework and can be widely distributed throughout the organization as well as to external organizations for user-specific analyses.

FIG. 2B provides a step-by-step overview of the fundamentals of the MtF framework. An example of an implementation of this method and why it represents a standard for simulation-based risk/reward management can be found in pending U.S. patent application Ser. No. 09/811,684, the contents of which are herein incorporated by reference. Mark-to-Future is a framework designed not merely to measure risk and reward, but also to manage the trade-off of risk and reward. Referring to FIG. 2, the steps described below are performed in an implementation of this framework.

Step 1 (Marked as 100 in FIG. 2B): Definition of Scenarios.

In the MtF framework, scenarios represent the joint evolution of risk factors through time and are, thus, the ultimate determinant of future uncertainty. The explicit choice of scenarios is the key input to any analysis. Accordingly, scenarios directly determine the future distributions of portfolio MtF values, the dynamics of portfolio strategies, the liquidity in the market and the creditworthiness of counterparties and issuers.

Step 2 (Marked as 110 in FIG. 2B): Definition of Basis Instruments.

Portfolios consist of positions in a number of financial products, both exchange traded and over-the-counter (OTC). The MtF Cube is the package of MtF tables, each corresponding to an individual basis instrument. A basis instrument may represent an actual financial product or an abstract instrument. As the number of OTC products is virtually unlimited, it is often possible to reduce substantially the number of basis instruments required by representing the MtF values of OTC products as a function of the MtF values of the abstract instruments.

Step 3 (Marked as 120 in FIG. 2B): Generation of the MtF Cube.

The MtF Cube consists of a set of MtF tables each associated with a given basis instrument. The cells of a MtF table contain the MtF values of that basis instrument as simulated over a set of scenarios and a number of time steps. These risk factors, scenario paths and pricing functions are simulated for the MtF values at this stage.

Step 4 (Marked as 130 in FIG. 2B): Mapping of the MtF Cube into Portfolios and Portfolio Strategies.

From the MtF Cube, multiple portfolio MtF tables can be generated as functions of the MtF tables associated with each basis instrument. Key to the MtF framework is the premise that a MtF Cube is generated independently of portfolio holdings. Any portfolio or portfolio regime can be represented by mapping the MtF Cube into static or dynamically changing portfolio holdings.

Step 5 (Marked as 140 in FIG. 2B): Estimation of Risk/Reward Measures Derived from the Distribution of Portfolio MtF Values.

The portfolio MtF table resulting from the mapping of the MtF Cube into a given portfolio or portfolio strategy contains a full description of future uncertainty. Each cell of the portfolio MtF table contains a portfolio MtF value for a given scenario and time step. The actual risk and reward measures chosen to characterize this uncertainty can be arbitrarily defined and incorporated strictly as post-processing functionality in the post-Cube stage.

Step 6 (Marked as 150 in FIG. 2B): More Advanced Post-Processing Applications Using the MtF Cube.

MtF Cubes may serve as input for applications more complex than calculating simple risk/reward measures. The properties of linearity and conditional independence on each scenario can be used to obtain computationally efficient methodologies. For example, conditional independence within a particular scenario is a powerful tool that allows the MtF framework to incorporate processes such as joint counterparty migration effectively. In addition, portfolio or instrument MtF tables may be used as input to a wide variety of scenario-based risk management and portfolio optimization applications.

Referring again to FIG. 1, at step 70, given the Mark-to-Future Cube, it is straightforward to characterize the future behaviour of a portfolio consisting of simulated instruments. For example, summing the products of the instrument values and their respective position sizes in the portfolio yields samples of the portfolio value over scenarios and time. These samples can be used to construct an empirical distribution of the portfolio value at each time point, from which it is possible to calculate a variety of risk and return measures (e.g., Value-at-Risk, mean return, volatility, etc.).

It is important to note that the approach described above with reference to FIG. 1 typically involves a large number of calculations, particularly at step 60, which may involve millions of individual valuations at every time point. Moreover, large amounts of scenario data may need to be stored and manipulated prior to being processed by the pricing functions.

To address these issues, various techniques, such as low-discrepancy sequences and stratified sampling methods have been developed to reduce the number of scenarios without compromising the statistical quality of the results. Generators represent another useful advance in dealing with these issues; their ability to be passed to various software components and produce scenarios on demand allows generators to replace the large data files that might otherwise be required. Furthermore, it is possible to construct generators that produce not only scenarios, but also actual prices for instruments or portfolios. This integration of the scenario generation and pricing tasks leads to further gains in efficiency.

To illustrate the capabilities of generators, the tools described herein are used to build a framework of reusable and flexible components for portfolio simulation, of which an embodiment is described later in this specification. As an example, consider the classical single-step, log-return model for generating scenarios along with the two variations of this model mentioned previously—one based on quasi-random generation (low-discrepancy sequences), and the other based on stratified sampling techniques.

In this single-step example, a method of building a GenLib object for generating scenarios—a scenario generator—for each version of the model is illustrated under the heading of "Single-step scenario-generation and simulation framework". A method of defining pricing functions for individual instruments with maps (another abstraction provided by GenLib), and combining these maps into a single composite map that represents the pricing function for the whole portfolio is also illustrated therein. Finally, by combining the composite map with a scenario generator, a pricing generator is obtained, a generator that produces prices of the portfolio instruments over the scenarios generated by the scenario generator. The pricing generator can be directly used by an application component to populate a Mark-to-Future Cube, which can then be processed, as required, for portfolio risk management.

Generators

The generator is the main concept in GenLib. Details on generators can be found in Merkoulovitch, "GenLib: Introduction to Generators", *Algo Research Quarterly*, 4(3); 37-55 (2001), the contents of which are herein incorporated by reference. A generator is an abstract representation of a sequential process. It can be viewed as a device that can sequentially produce (i.e., generate) weighted elements of a particular type governed by the sequential process. The elements produced by a generator are called its generated elements and the type of these elements is called the output type of the generator. The sequence generated by a generator can be finite or infinite, deterministic or stochastic.

The generation of elements is most preferably sequential (from the user's perspective); the elements are produced one by one. Formally, the n-th element from the generator can be obtained only after all of the preceding n−1 elements have been generated. In the case of a finite sequence, once a generator has produced all of its elements, it is said to be exhausted. Generated elements are weighted in the sense that a real number is assigned to each generated element. This number is called the weight of the generated element and has different interpretations for different types of generators (e.g., probability, time increment).

In mathematical terms, suppose X is an arbitrary set of elements (such as numbers or vectors, for example). A generator of output type X produces a sequence $(\chi_0, \omega_0), (\chi_1, \omega_1), \ldots, (\chi_n, \omega_n), \ldots$, where $\chi_i \in X$ is an element generated at step i and $\omega_i \in R$ is the weight associated with this element.

In GenLib, the concept of a generator is represented by an abstract class template GLGen<X>, where X is a class of objects forming the output type of the generator. Each concrete type of generator (i.e., one that can be instantiated) has a so-called constructing function for creating generators of this concrete type. This constructing function can use constructors (i.e., a C++ method that creates and initializes a new instances of a class) or more general constructing patterns and operations to create generators of the specified type.

As a simple example of a concrete type of generator, consider a class of pseudo-random number generators, that is, generators that produce random, uniformly-distributed elements from the unit interval [0,1]. This class has a constructing function glRnGen. A concrete random number generator can be created as follows:

```
GLGen<double> gen=glRnGen (seed);
```

The statement above creates a generator gen. The parameter double indicates that the generator produces elements of the type double (i.e., real numbers), while seed is an arbitrary integer parameter that predetermines the pseudo-random sequence. The weight of each generated element for this type of generator is equal to one.

Some output types of generators are widely used in various applications. When defining generators with these output types, the special short form notations as outlined in the following table (Table 1) may be used:

TABLE 1

Short form notations for common generator types

| Short form | Complete form | Type of generated elements |
| --- | --- | --- |
| GLNumberGen | GLGen<double> | real number |
| GLIntGen | GLGen<int> | integer |
| GLVectorGen | GLGen<GLVector> | vector of real numbers |
| GLGenGen<X> | GLGen<GLGen<X>> | generator of X |

Using the short-form notations, the random number generator above can also be created as follows:

```
GLNumberGen gen=glRnGen (seed);
```

Common Generator Interface

The actual precise definition of a generator is provided by the set of functions or methods that it must support. These methods predetermine the ways of manipulating generators and form the common generator interface (CGI) that transforms the conceptual idea of a generator into a strictly defined abstraction. The following table (Table 2) lists the typical operations that comprise the CGI in one embodiment of the present invention:

TABLE 2

Methods of a common generator interface

| Method | Action |
| --- | --- |
| *gen | Returns the last generated element |
| ++gen | Generates the next element and returns true if the generator is not exhausted and false otherwise. |
| gen.getWeight() | Returns the weight of the last generated element. |
| gen.getAccumWeight | Returns the cumulative weight of all generated elements. |
| gen | Returns true if the generator is not exhausted, and false otherwise, when used in logical expressions. (There is a type conversion from the generator to the Boolean type.) |
| gen.reset() | Resets the generator to its initial state. |

In variant embodiments of the invention, two or more of the above methods may be combined in a single method.

Persons familiar with object-oriented programming may notice a formal similarity between the interfaces of generators and iterators (in the object-oriented programming sense). This similarity allows one to use a wide set of algorithms defined, for example, in the Standard Template Library (STL), based on the iterator interface. There is, however, an important semantic difference between generators and iterators: iterators usually iterate over containers of pre-calculated data, while a generator "iterates" over the data generated during the iteration process by the generator itself. If the last generated element is not stored before the next "++" operation is applied to the generator, this element is destroyed and the only way to re-obtain it is to reset the generator and start the generation process from the beginning.

FIG. 3 illustrates a sample block of code that demonstrates the usage of the CGI, shown generally as 160. In this example, n elements are generated and output using an arbitrary generator gen. At each iteration, the code checks to see whether the generator is exhausted. If it is not, then the code outputs the index, value, weight and cumulative weight of the last generated element, and advances the generator (i.e., produces the next element). If the generator is exhausted, the program outputs a message and exits from the loop.

Since the CGI is identical for all generators, FIG. 3 effectively provides an operational guide on the usage of any generator. Thus, the CGI allows an application to manipulate all generators in exactly the same way; the actual generator itself is completely arbitrary.

When defining a concrete generator type, all operations of the CGI must be specified and implemented (in object-oriented programming terminology, concrete generator types are said to be derived from the base GLGen type). It is only through its constructing function, and not the CGI, that one concrete generator type is distinguished from another.

Kinds of Generators

Many different kinds of generators can be defined under the conceptual framework described above. For example, deterministic generators, sample generators, distribution generators, stochastic sequence generators, and generators of generators are described below. Examples of concrete generators of each kind are also provided, and their some examples of their important features are highlighted. In the description that follows, examples of constructing functions will be referred to. It will be apparent to persons skilled in the art that the precise means to implement a specific constructing function may differ among different embodiments of the present invention. In GenLib C++ programs, a constructing function for a class is a function with global scope, which returns an instance of the given class. Constructing functions are similar to C++ constructors, but are not class methods. For example, a general naming pattern can be implemented as follows: the construction for a class GLAnyClass will be named glAnyClass. Its arguments will be the arguments of the constructor for GLAnyClass, and its return type will be GLAnyClass.

Deterministic Generators

Deterministic generators produce deterministic sequences of elements. Such generators can represent a wide spectrum of deterministic mathematical models from simple arithmetic sequences to complicated quasi-random multidimensional sequences or sequences of states for complex non-linear dynamic systems. The weight of each element generated by a deterministic generator typically equals one. The getAccumWeight method returns the index of the last generated element in this case.

Consider, for example, the vector arithmetic progression defined by $x_0=a_0, x_{i+1}=x_i+d$ for $i=0,1,\ldots$. An infinite deterministic generator for this sequence is created by calling the glArithProgrGen constructing function as follows:

```
GLVectorGen gen=glArithProgrGen<GLVector> (a0,
    d);
```

In contrast to the infinite generator created above, the statement

GLNumberGen gen=glBinomialCoefficientsGen(n);

creates a finite generator of binomial coefficients $$\{C_n^0, C_n^1, \ldots, C_n^n\}, \text{ where } C_n^k = \frac{n!}{k!(n-k)!} \text{ for } k = 0, \ldots, n.$$

The expression

GLVectorGen gen=GlSobolSequenceGen (n);

constructs an infinite generator of the quasi-random Sobol sequence over the n-dimensional unit cube. This generator can be used in the subsequent example to implement the low discrepancy approach for scenario generation, (as described in, for example, Kreinin et al., *Measuring portfolio risk using Quasi Monte Carlo methods*, Algo Research Quarterly, 1(1): 17-25 (1998) and Kreinin et al., *Principal Component Analysis in Quasi Monte Carlo simulation*, Algo Research Quarterly, 1(2): 21-29 (1998), the contents of which are herein incorporated by reference).

As a further example of deterministic generators, the statement

GLNumberGen gen=glLogisticGen (a0, lambda);

creates an infinite generator of states of the so-called chaotic logistic dynamic system: $x_0 = a_0, x_{i+1} = \lambda_{x_i}(1-x_i)$ for $i=0,1,\ldots$. Such chaotic systems can be used, for example, as an alternative to stochastic processes for describing the dynamics of financial markets.

Sample Generators

A sample generator produces independent samples from a given probability distribution. Usually, such generators are infinite and assign a weight of one to each generated element.

The previously described random number generator created by the constructing function glRnGen is one example of a sample generator. Often, the random number generator can be a component of other, more complex generators that require random numbers.

For instance, the statement

GLNumberGen gen=glStdNormSampGen (rn_gen);

constructs a generator of samples from the standard normal distribution N(0,1). The glStdNormSampGen constructing function requires a random number generator to be passed as a parameter. In the statement above, rn_gen represents an existing (i.e., previously created) random number generator. Alternatively, it is possible to provide a new random number generator created directly by a constructing function;

GLNumberGen gen=glStdNormSampGen (glRnGen (seed));

The ability to use generators as inputs to constructing functions is a powerful feature that allows increasingly complex generators to be created. The elements produced by the generator passed to the constructing function are used, in turn, by the new generator to produce its own output sequence. As is shown later with reference to FIG. 9, one particular implementation of glStdNormSampGen is extremely simple and consists of only one line of code.

When sampling from multivariate distributions, the resulting elements are vectors. Consider, for example, producing a sequence of uniformly distributed points in the n-dimensional unit cube. In this case, an appropriate sample generator can be created as follows:

GLVectorGen gen=glStdUnifSampVectGen (n, rn_gen);

As in the previous example, a random number generator is passed to the constructing function.

The t-distribution is a fat-tailed distribution that is widely used in financial applications. A generator of samples from the t-distribution with df degrees of freedom can be constructed in a manner similar to the previous examples:

GLNumberGen gen=glTDistSampGen (df, rn_gen);

Distribution Generators

Distribution generators produce discrete probability distributions; their generated elements form the support of the distribution and the weights are the corresponding probabilities of these elements. Mathematically, the sequence $(x_0,w_0),(x_1,w_1),\ldots$, where $x_i$ is an element of some space $X_i$ can be interpreted as an atomic distribution on X concentrated at the points $x_0,x_1,\ldots$ with corresponding probabilities $w_0,w_1,\ldots$.

Distribution generators can be finite or infinite. For instance, the statement

GLNumberGen gen=glBinomialDistribGen (n, p);

creates a generator for the binomial distribution. The generator produces a finite sequence of n+1 elements $x_k = k$ with weights $$w_k = C_n^k p^k (1-p)^{n-k} \text{ for } k = 0, \ldots, n.$$

In contrast, an infinite generator for the Poisson distribution with intensity $\lambda$ can be constructed as follows:

GLNumberGen gen=glPoissonDistribGen (lambda);

The generator produces the sequence of elements $x_k = k$ with weights $$w_k = e^{-\lambda} \cdot \frac{\lambda^k}{k!} \text{ for } k = 0, 1, \ldots.$$

The generated elements may be vectors in the case of multivariate discrete distributions. For example, in Jamshidian and Zhu, *Scenario simulation theory and methodology*, Finance and Stochastics, 4(1):43-67 (1997), the authors develop a discrete vector distribution that approximates a multivariate normal distribution. A finite generator for this discrete distribution is created by the statement GLVectorGen gen=glMultivarJamshidianDistribGen (num_nodes);

where the vector parameter num_nodes defines the number of approximation nodes over each coordinate. This generator will be used in an example described with reference to FIG. 13 to implement the stratified sampling approach for generating scenarios.

Stochastic Sequence Generators

Stochastic sequence generators produce sequences of stochastic elements $x_0,x_1,\ldots$ in an arbitrary space X over time. In particular, these sequences can represent, for example, sample paths for stochastic difference or differential equations, time series, and historical data. The weights of generated elements $w_0, w_1, \ldots$ represent the initial time point ($t_0 = w_0$) and the subsequent time steps ($\Delta t_i = w_i, i = 1, 2, \ldots$) for the generated elements. Thus, the elements $x_0, x_1, \ldots$ are associated with the time points $t_0, t_1, \ldots$ where $t_i = t_{i-1} + \Delta t_i$ for $i = 1, 2, \ldots$. Note that the absolute times $t_0, t_1, \ldots$ are provided in this case by the getAccumWeight method of the generator.

For example, the following code creates a generator of a correlated multivariate geometric Brownian motion (more precisely, a generator of a realization or a sample path of this process):

```
GLVectorGen gbm_gen=glGBMStochSeqGen (x0,
    time_gen, A, std_norm_gen);
```

The input parameters are defined as follows: x0 is a vector providing an initial state of the sequence at time $t_0$, time_gen is a generator of time points $t_0, t_1, \ldots$ for the sequence; A is a linear transformation matrix that correlates the generated vector components (i.e., A is the square root of the required covariance matrix); and std_norm_gen is a generator of standard normally distributed vectors with independent components.

In particular, to generate a stochastic sequence with equal time steps dt, time_gen should be a (deterministic) generator of an arithmetic progression. As described previously, a suitable generator can be constructed as follows:

```
GLNumberGen time_gen=glArithProgrGen<double>
    (t0, dt);
```

The required sample generator std_norm_gen can be constructed as follows:

```
GLVectorGen
    std_norm_gen=glMultivarStdNormalSampleGen
    (dim, glRnGen (seed));
``` where dim is the number of components of the multivariate Brownian motion and glRnGen(seed) returns a random number generator.

Generators of Generators

A generator of generators produces a sequence $g_0, g_1, \ldots$ whose elements are themselves generators of elements of a particular type. In this case, the interpretation of the weights associated with the generators depends on the particular nature of the generator producing them.

For example, the stochastic sequence generator gbm_gen described above produces a single realization (one sample path) of the geometric Brownian motion process. If multiple realizations of this process are required (such as when generating a set of multi-step market scenarios, for instance) then a separate stochastic sequence generator must be created for each path. This can be achieved by means of the following generator, constructed from gbm_gen, which produces stochastic sequence generators:

```
GLGenGen<GLVector>
    gbm_gen_gen=glCloneGenGen<GLVector>
    (gbm_gen);
```

Each of the generators produced by gbm_gen_gen corresponds to a particular realization of the same process. In this case, the notation GLGenGen<GLVector> indicates that gbm_gen_gen creates generators whose output elements are vectors of real numbers.

Building Generators

The standard way to define a new concrete class of generators is to derive it from the base GLGen class (i.e., the new concrete class implements methods inherited from GLGen). However, following this approach whenever a new type of generator is required can lead to an endless implementation of new application-specific classes of generators. A more preferable option is to provide a set of tools for building new, complex generators from simpler existing generators. These tools include an expanded collection of objects (in addition to generators), such as maps, accumulators and pricing maps, along with a flexible and comprehensive system of operations on these objects. In the following paragraphs, a subset of these tools are described, including operations on generators, map objects and so-called mixed-type operations that apply jointly to maps and generators.

Operations on Generators

A critical tool for building complex generators is the set of operations that allows one to manipulate generators in symbolic form—effectively, these operations represent an algebra of generators. This means that generators may be combined according to pre-specified rules, with other operands into expression resulting in other generators. It will be understood by persons skilled in the art that a generator can be said to participate in an expression if it is an operand of one or more operations in the expression. An overview of the algebra's main, underlying concepts, and several examples of operations on generators are provided.

Underlying and Composite Generators

Figure 4:
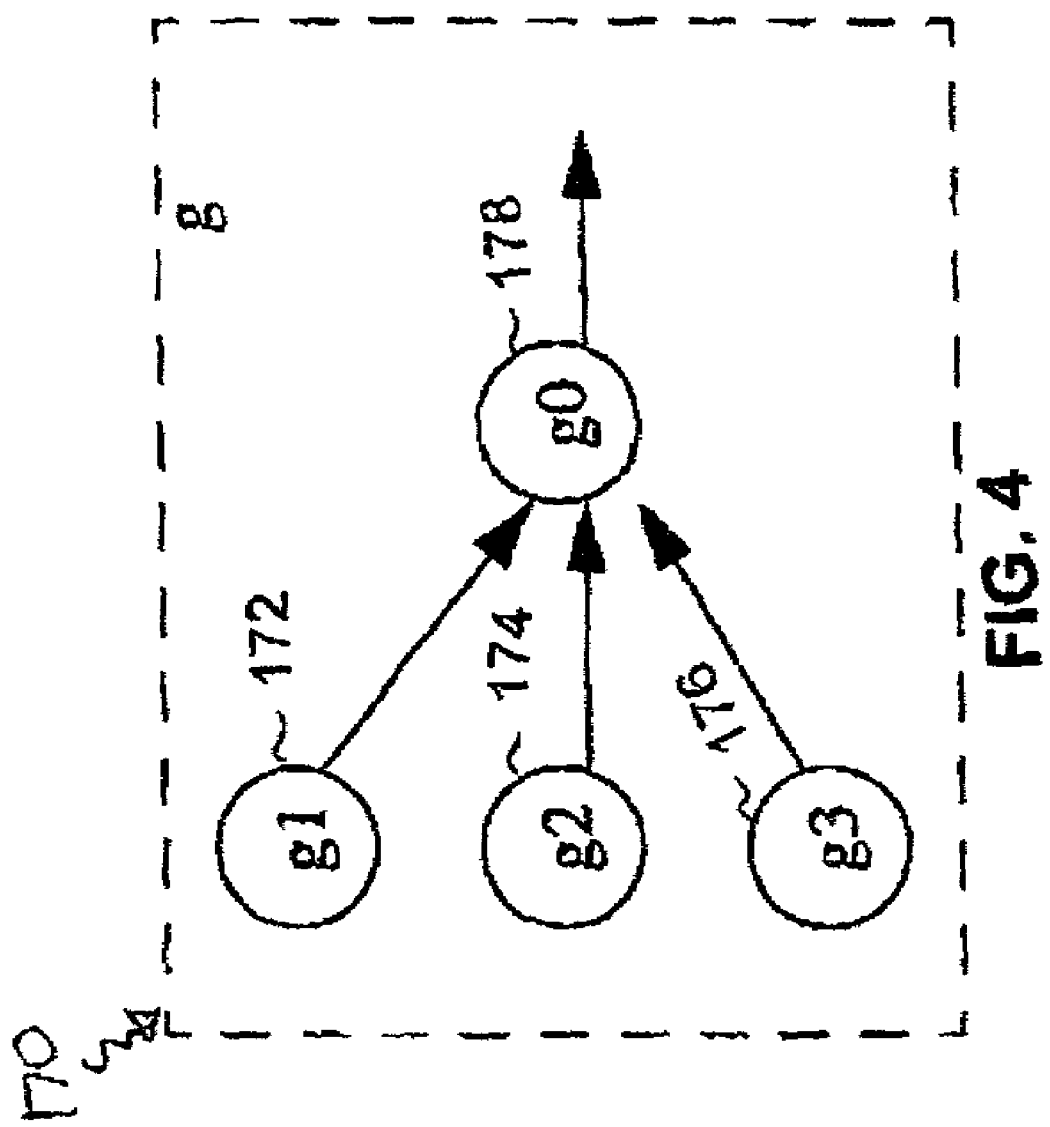
FIG. 4 is a schematic diagram illustrating the components of a composite generator.

The basic feature that enables the construction of operations on generators is the ability of generators to accept, store and manipulate other generators passed as parameters to their constructing functions. For example, FIG. 4 shows a generator g shown generally as 170, whose constructing function accepts three generators g1, g2 and g3 as parameters (shown as 172, 174, 176 respectively). g0 (shown as 178) is referred to as a composite generator and g1, g2 and g3 are referred to as its underlying generators. A composite generator uses the output from its underlying generators to produce its own elements.

Examples of composite generators were provided in previous sections: the stochastic sequence generator of a multivariate Brownian motion (gbm_gen) used underlying generators of a time sequence and of samples from a multivariate normal distribution; and the generator of generators (gbm_gen_gen) accepted gbm_gen as a parameter.

There are two different ways to interpret FIG. 4, relating to either the construction or the subsequent exploitation of a composite generator. In the first case, which is of primary interest in this section, g0 (more precisely, its constructing function) can be viewed simply as an operation on g1, g2 and g3 that produces a generator g (i.e., g=g0 (g1, g2, g3)). Alternatively, the diagram can be viewed as a network of generators in the sense that it describes the flow of data between them (i.e., the elements produced by g1, g2, and g3 are used by g0 to produce its own output sequence).

In a similar manner, the constructing function of any composite generator can be viewed as an operation on the underlying generators. This allows very general operations to be designed so that generators can be combined to produce new, more complex generators that, in turn, can be used for further constructions.

Figure 5:
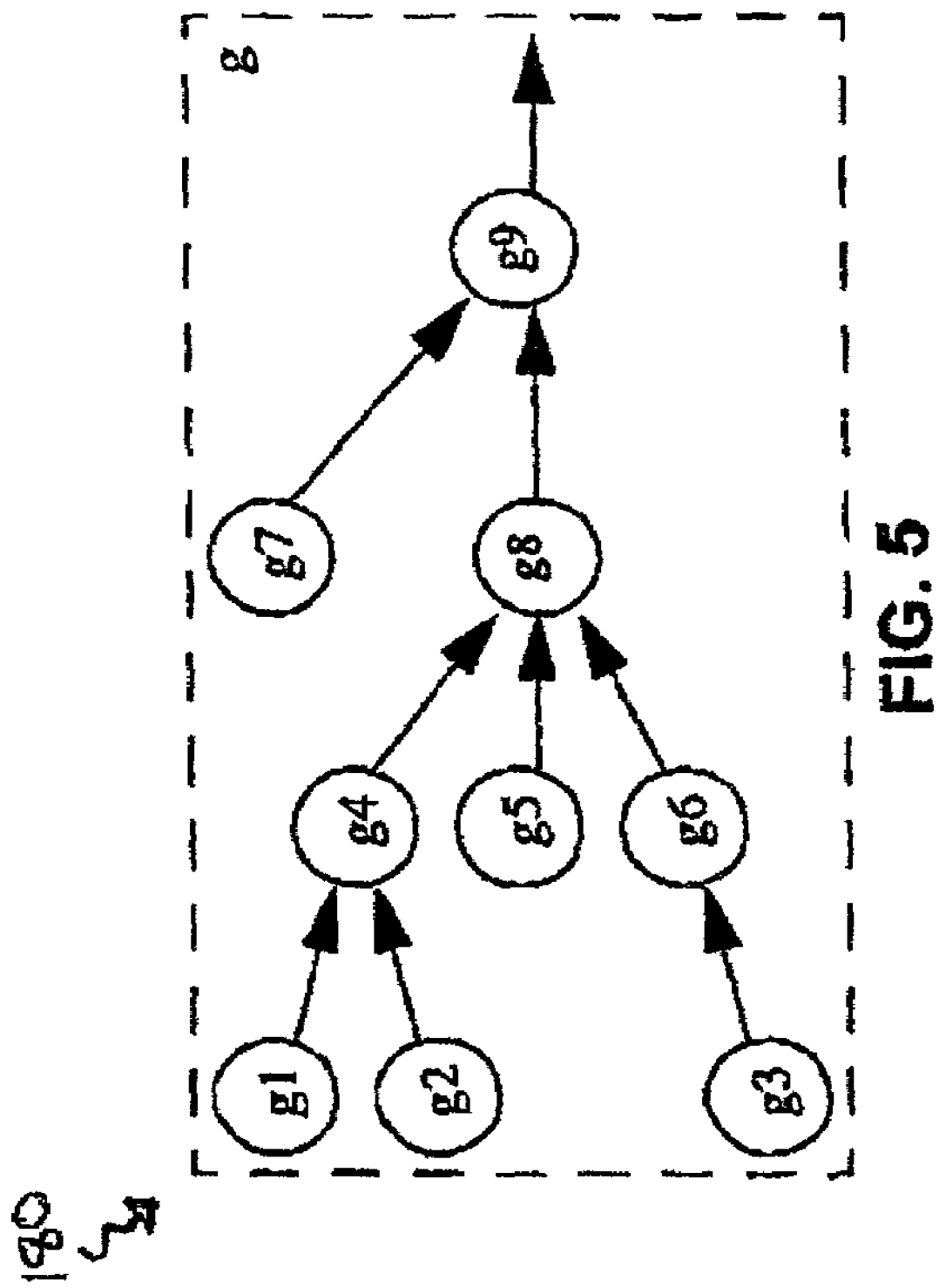
FIG. 5 is a schematic diagram illustrating a network of collaborating generators.

For example, consider the network of collaborating generators in FIG. 5, shown generally as 180. When viewed in terms of operations, the final complex generator g can be expressed compactly as:

g=g9 (g7,g8(g4(g1,g2),g5,g6(g3))).

EXAMPLES OF OPERATIONS ON GENERATORS

As a first example of a concrete operation on generators, consider a simple binary arithmetic operation, such as a sum of generators: g=g1+g2. This operation constructs a generator g that sums the corresponding elements of the underlying generators g1 and g2. The weights of the generated elements will be equal to the weights of elements produced by g1. Other arithmetic operations, such as the product of generators or the product of a scalar and a generator, are defined similarly.

As another example, the function glSequentialVectorGen (dim, gen) is a unary operation that forms dim-dimensional vectors from successive elements of the underlying number generator gen. This operation can be used, for instance, to define the constructing function glStdUnifSampVectGen (Block A of FIG. 6 shown as 190), which returns a generator of samples from the multivariate uniform distribution as described in the section "Sample generators". Similarly, given a univariate sample generator for any probability distribution, a constructing function that returns a multivariate sample generator for the distribution can be easily implemented.

The function glMixGen<X>(gens,ind_gen) represents an operation on multiple generators. In this case, gens is an array of underlying generators of the same output type (X) and ind_gen is an integer generator that produces indices into this array. The function glMixGen creates a generator that produces, at each step, the element generated by an underlying generator from the array gens, selected according to the index provided by ind_gen.

For example, if ind_gen cyclically returns the numbers 0, 1, . . . ,n−1 (where n is the dimension of the array gens), a generator that successively queries its underlying generators and returns their elements is obtained.

Suppose that gens consists of sample generators and let ind_gen produce integers from $\{0,1, \ldots ,n-1\}$ with corresponding probabilities $\{p_0,p_1,\ldots,p_{n-1}\}$ defined by the vector probs:

GLIntGen ind_gen=glStdDiscreteSampleGen (probs, glRnGen ( ));

In this case, applying the glMixGen operation to gens and ind_gen creates a sample generator from the mixture of distributions that correspond to the generators in gens. The corresponding constructing function is defined in Block B of FIG. 6 shown as 192.

A widely used model for generating risk factor distributions with fat tails consists of a mixture of two normal distributions with different standard deviations. The constructing function glNormalMixtureGen (Block C of FIG. 6 shown as 194) creates a generator for such a fat-tailed distribution, which is the mixture of two normal distributions with probabilities p and 1−p. Note that in Block C of FIG. 6 (194), glNormalGen constructs a generator of samples from a normal distribution with a given mean and standard deviation.

As illustrated by the above examples, operations on generators enable the simple and elegant definition of constructing functions for various useful types of generators.

Maps

In GenLib, a map represents a rule that, for each object of a given type, defines a corresponding object of another type. In addition to being important in their own right, maps are also very useful for creating new generators.

Concept of a Map

A map is interpreted in the usual mathematical sense, that is, m:X→Y, where X and Y are arbitrary spaces. Conceptually, in the library a map is represented by the abstract class template GLMap<X, Y>. In this case, X and Y correspond to spaces of objects of types X and Y. For example, a map $m:R^n \to R$ that maps an n-dimensional vector to a real number is represented by an object of the type GLMap<GLVector, double>.

As with generators, the actual definition of a map is provided by a common map interface. The common map interface consists of an evaluation function or method that receives as input elements of type X and that returns elements of type Y. Technically, the method can be implemented using the C++ evaluation operator in a preferred embodiment of the invention, so that one can apply maps with exactly the same syntax as used in mathematics (i.e., y=m(x)).

As in the case of generators, any concrete map type is a subtype of the GLMap<X, Y> class template, and it has an associated constructing function. For example, glLinearOperator is the constructing function for the linear map discussed previously.

For example, the statement

GLMap<GLVector, GLVector> m=glLinearOperator (A);

creates a map m corresponding to the linear transformation defined by the matrix A, that is, m(x)≡Ax. The code in FIG. 7, shown generally as 200, illustrates the usage of maps. It applies this map to the vectors input by the user and outputs the resulting images.

As a more complex example, consider the constructing function glFindIntervalMap, which accepts a single vector parameter $v=(v_0,v_1, \ldots ,v_{n-1})$ where $v_0<v_1< \ldots <v_{n-1}$. The components of v define a partition of the real line for n+1 intervals $I_0=(-\infty,v_0), I_1=[v_0,v_1), \ldots ,I_{n-1}=[v_{n-2},v_{n-1}) I_n=[v_{n-1},\infty)$.

The map m created by this constructing function

GLMap<double,int> m=glFindIntervalMap(v);

maps any real number to the index of the interval to which this number belongs.

Maps represent powerful tools for developing general software components. Since maps are objects, they can be passed as parameters to software components, allowing them to perform arbitrary transformations without regard for the specific nature of the map. As such, components can provide wide functionality with minimal maintenance.

Consider, for example, a function calcIntegral(f,a,b,h);

that uses some numerical method to calculate the integral $$\int_a^b f(x) dx$$

This function accepts a parameter f of the general type GLMap<double,double>, along with the bounds for the interval a and b and the step-size h. Thus, the actual function to be integrated (i.e., a map) can be passed to this function as a parameter.

When generating scenarios, one can use a number of dimensionality reduction methods, such as principal component analysis. These methods can be naturally described as maps between the original and the reduced risk factor spaces. Thus, the scenario-generation component can accept the selected dimensionality reduction method as a parameter and use it when generating scenarios.

Another example is a pricing function of an arbitrary financial instrument that, for a given valuation time, can be described as a map from the corresponding space of risk factors to the space of values of this instrument. As will become apparent in the subsequent example, implementing pricing functions as maps allows for the creation of generators of instrument values. In this case, the ability to pass maps as parameters makes it possible to build a flexible simulation framework that can be easily extended to include new instruments.

Operations on Maps

As with generators, flexibility in manipulating maps is provided by a set of map operations. For example, GenLib supports a wide range of operations on maps, including arithmetic operations (e.g., sum and product of maps, product of a scalar and a map), methods of creating maps from ordinary C-functions, scalar and Cartesian products of maps, merging maps, and so on.

Figure 8:
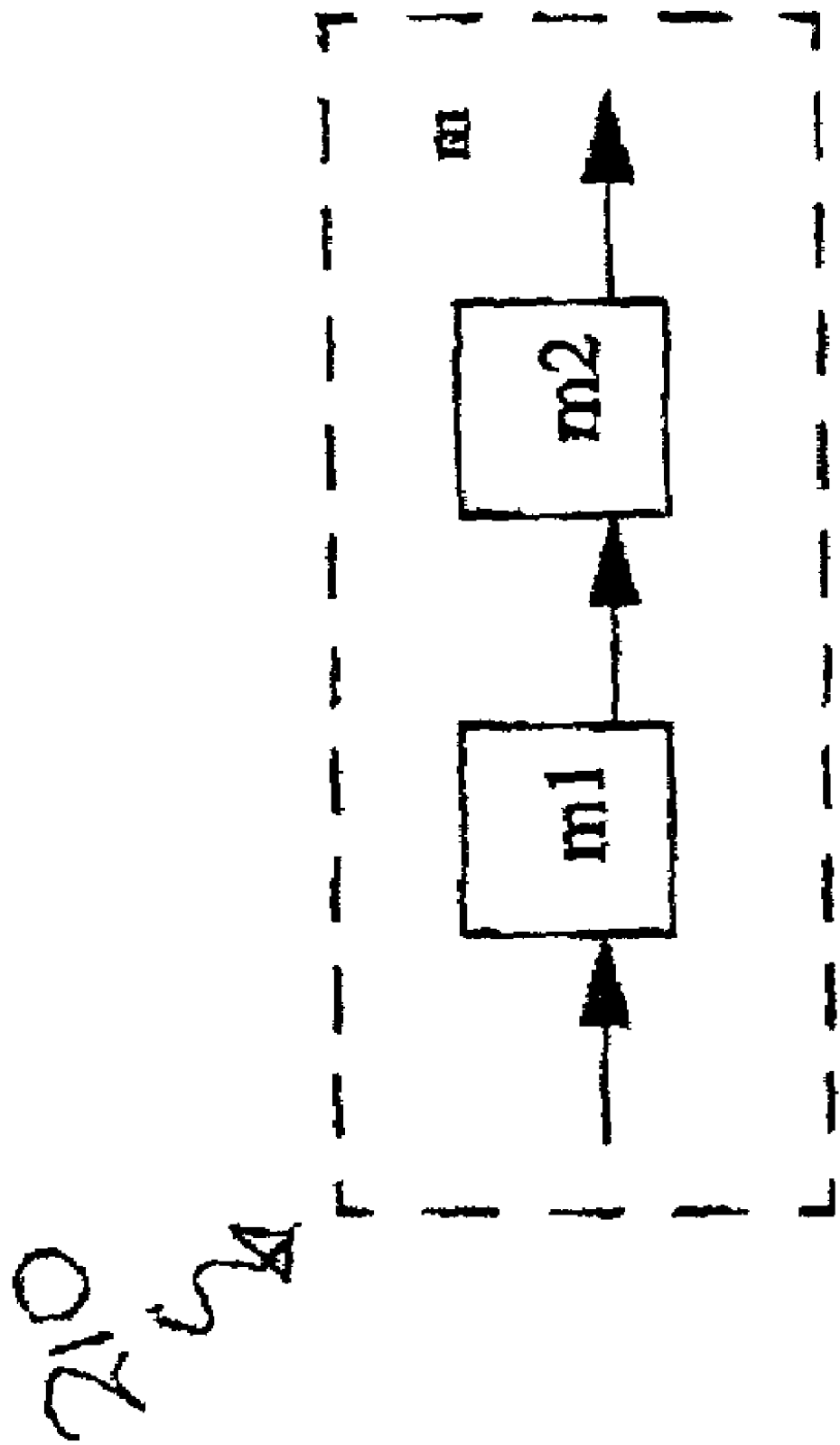
FIG. 8 is a schematic diagram illustrating the composition of maps.

In the library context, as well as in mathematics, composition represents one of the most powerful and natural map operations. The composition of any two maps $m_1:X \rightarrow Y$ and $m_2:Y \rightarrow Z$ is a map $m:X \rightarrow Z$ defined by the formula $m(x)=m_2(m_1(x))$. In GenLib, composition is implemented in terms of the << operator. Thus, the statement GLMap<X,Z> m=m2 << m1;

creates the composition of maps m1 and m2, depicted graphically as 210 in FIG. 8.

As an example of an operation on multiple maps, consider the glScalarMergeMap operation. Suppose $m_0, m_1, \ldots, m_{n-1}$ are maps from X to Y. A scalar merge of $m_0, m_1, \ldots, m_{n-1}$ is a map, m, that maps an element $x \in X$ to the vector of its images $m_0(x), m_1(x), \ldots, m_{n-1}(x)$. Thus, if $m_0, m_1, \ldots, m_{n-1}$ represent pricing functions of financial instruments, for example, then the scalar merge of these maps represents the vector pricing function of the portfolio of these instruments. Given an array of maps map_arr (i.e., map_arr is of type GLArray<GLMap<X, Y>>), the statement GLMap<X, GLMathVec<Y>>
   m=glScalarMergeMap<X, Y>(map_arr);

creates a scalar merge of the maps in the array. (Note that GLMathVec<Y> is a class of vectors with components of type Y.)

Accumulators

An accumulator is a generalization of a map. Similar to a map, an accumulator accepts input of some specific type and returns some output of another specific type. However, in preferred embodiments of the invention, unlike a map, an accumulator accepts data with an accompanying weight, which is a real number, called the accumulated weight. The accumulator also returns a result with a corresponding weight. More importantly, in contrast to a map, an accumulator possesses an internal state, which may be modified by the action of accepting the data, and which may be a function of the previous value of the internal state and of the accepted data and weight, in order to produce an updated current value. The value returned by an accumulator is a function of the current value of the internal state. The corresponding weight returned by the accumulator may also be a function of the internal state.

Concept of an Accumulator

In the mathematical sense, an accumulator is a sequence of functions $f_i = (X \times R) \times (X \times R) \times \ldots (X \times R) \rightarrow Y$, where the number of copies is i, the same as the number of updates which have occurred so far, and R is the set of real numbers. In GenLib, an accumulator is represented by the abstract class template GLAcc<X, Y>. For example, an accumulator whose input is a vector and whose output is a matrix is represented by an object of the type GLAcc<GLVector, GLMatrix>.

The common accumulator interface consists of a method that receives as input a new value, updates the internal state of the accumulator, and computes the current return value (the accept method). The common accumulator interface also consists of a method returning the current value of the accumulator (e.g., in the preferred embodiment of the invention, the overloaded dereference operator *( )) and a method to get the current accumulated weight, getAccWeight. In variant embodiments of the invention, two or more of the above methods may be combined in a single method.

As in the case of generators, any concrete accumulator type is a type derived from the GLAcc<X, Y> class template, and it has an associated constructing function. For example, glEwmaCovMatAcc is the constructing function for an accumulator of type GLAcc<GLVector, GLMatrix>, which computes the well-known exponentially weighted moving average estimate of the covariance matrix of the process generating the input vector data.

The above example illustrates a historical data accumulation framework. Suppose that the input vector data represents the daily returns on a set of equities over some period. At each update, the accumulator would return the historic covariance of returns on those equities.

Pricing Accumulators

Pricing accumulators are an important special case of accumulators, in which the weight corresponds to time increments. This property makes them particularly well-suited to model processes which occur in time and which may depend on the past and present values of other underlying process which occur in time.

An example is a pricing accumulator returned by a constructing function glSwaptionPrAcc, which computes the value of a swaption contract based on the past and present values of underlying instruments and risk factors. The input data is a data structure containing the ensemble of values of the underlying instruments and risk factors at a point in time defined by the accompanying time increment. This point in time is returned as the accumulated weight from the pricing accumulator. The returned value is the updated value of the swaption contract at the same point in time.

Operations Involving Accumulators

Operations on accumulators can be defined, such as arithmetic operations. For example, two accumulators can be added to obtain another accumulator, provided that their inputs are of the same type and their outputs are of types for which addition is defined. Arithmetic operations involving an accumulator and an object of another types are also supported by GenLib, as long as the arithmetic operation is defined between the type of object in question and the output type of the accumulator. For instance, the swaption pricing accumulator discussed above may be multiplied by a real number representing a position taken in the swaption instrument. The result is another accumulator, with the same input and output types as the swaption accumulator, whose output is the value of the position.

Accumulators may also be composed with other accumulators to obtain more complex accumulators.

The following example syntax illustrates the composition of accumulators and the required conformity of input and output types. Because composition is not a symmetric operation, the roles of the two participating accumulators are not the same. Therefore, one may distinguish between the underlying accumulator and the dependent accumulator. The result is another accumulator, whose input is the same as the input of the underlying accumulator and whose output is the output of the dependent accumulator produced after receiving as input the output of the underlying accumulator.

```
GLAcc<X, Y> acc1= . . . ; // any valid initialization–
    this is the underlying accumulator GLAcc<Y,Z> acc2= . . . ; // any valid initialization–
    this is the dependent accumulator GLAcc<X,Z> acc3=acc2 << acc1;
```

Mixed-Type Operations

Operations on generators, maps and accumulators provide a great deal of flexibility for constructing new generators, maps and accumulators. This capability is further extended by mixed-type operations that involve objects of different types (e.g., generators, maps and accumulators). Such mixed-type operations are often referred to as constructing patterns, as they provide, in many cases, templates for constructing useful compound components.

Constructing Patterns

To illustrate the concept of a constructing pattern, consider a typical requirement in many financial simulation applications—the ability to sample from a given probability distribution P. A standard mathematical way to obtain the required samples is to apply the inverse cumulative distribution function (cdf) of P to random uniform samples. A constructing pattern that corresponds to this approach creates a generator of samples from P given its cdf (i.e., a map of type GLCdf) and a random number generator. The constructing pattern is provided by a constructing function glSampleFromCdfGen (cdf, rn_gen).

Using such general patterns allows for the definition of complicated constructions with a single line of code. For instance, the constructing function glStdNormSampGen (Block A of FIG. 9 shown as 220) will create and return a generator of samples from the standard normal distribution as described earlier under the heading of "Sample generators." In this case, GLStdNormalCdf returns a GLCdf object corresponding to the cdf of the standard normal distribution.

Using this function and the operation GLSequentialVectorGen described previously, a constructing function for generators of independent, identically distributed samples from the dim-dimensional multivariate normal distribution (Block B of FIG. 9 shown as 222) can be defined.

Finally, by applying an appropriate linear transformation A to the generator returned by glMultivarStdNormalSampleGen, a constructing function (Block C of FIG. 9 shown as 224) can be defined that creates a generator of samples from the correlated multivariate normal distribution with a given covariance matrix $\Sigma$ (note that the transformation matrix A must satisfy $\Sigma=AA^T$).

Composition of Maps and Generators

The implementation of glMultivarNormalSampleGen, in Block C of FIG. 9 shown as 224 illustrates an important mixed-type operation—the composition of a map and a generator.

Figure 10:
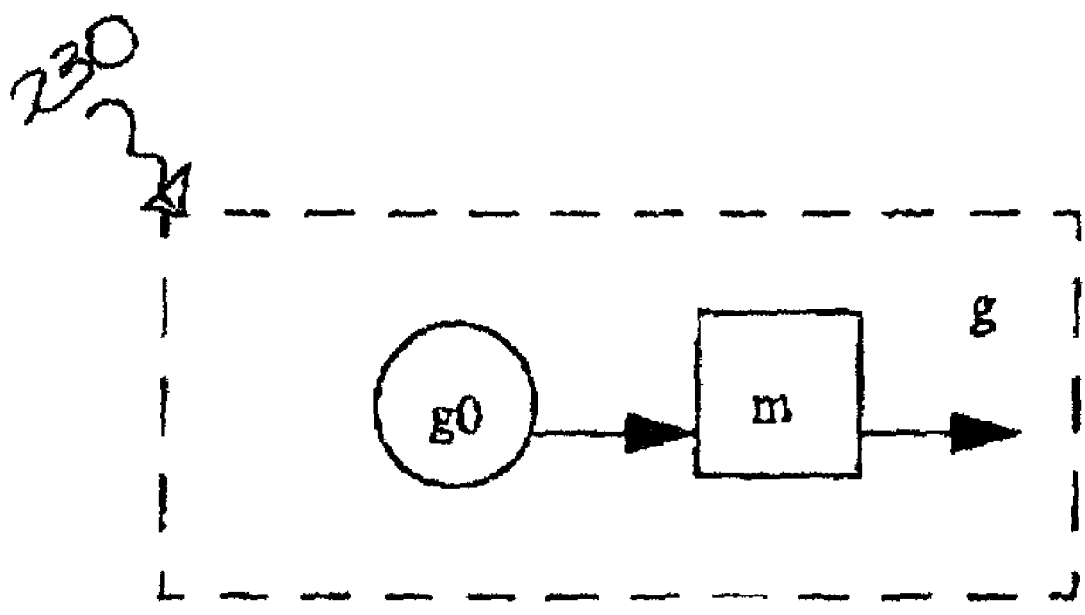
FIG. 10 is a schematic diagram illustrating the composition of a map and a generator.

In general, given a generator g of the type GLGen<X> and a map m of the type GLMap<X, Y>, one can define a generator whose output is obtained by applying m to the elements generated by g (shown as 230 in FIG. 10). Using the GenLib composition operator, such a generator can be created as follows:

```
GLGen<Y> compose_gen–m << g;
```

As suggested by the preceding example, compositions involving maps can be incorporated in a straightforward way into the generator networks introduced earlier with reference to FIG. 5.

Using composition, it is easy to implement the constructing pattern glSampleFromCdfGen from the previous section (Block A of FIG. 11 shown as 240). The function call glInvertedMap (cdf) returns a map that is inverse of the cumulative distribution function cdf.

Similarly, the constructing pattern glMultivarSampleFromCdfGen, implemented in Block B of FIG. 11 shown as 242, can be used to construct sample generators of vectors with independent, identically distributed components from a distribution given by its cdf. This pattern accepts a generator of the random, uniformly distributed samples from the multidimensional unit cube (e.g., such a generator can be created by the constructing function glStdUnifSampVectGen in Block A of FIG. 6). The implementation of the pattern uses the function glExtensionToVectorMap, which creates a vector map that applies a given scalar map to each component of the input vector.

Composing maps and generators is particularly effective when simulating financial instruments. Consider, for example, a map representing the pricing function of a portfolio of financial instruments (e.g., defined by a scalar merge operation as described earlier), as well as a generator of market scenarios. In this case, the composition of the given map and generator produces a portfolio pricing generator or simulator, that is, a generator of instrument values over a set of scenarios. A key benefit of this composition is that it eliminates the need for maintaining scenario data required as input to pricing routines. By combining scenario generation and pricing into a single process, one can effectively pass a simulator, rather than data files, to applications that need to price the instruments.

Composition of Maps and Accumulators

In a manner similar to the composition of maps and generators, the following composition yields an accumulator whose input is the same as that of the original accumulator, and whose output is the output of the original accumulator transformed by the given map.

```
GLAcc<X, Y> acc1= . . . ; // any valid initialization

GLMap<Y,Z> map= . . . ; // any valid initialization

GLAcc<X,Z> acc2=map << acc1;
```

Composition of Accumulators and Generators

The following composition yields a generator whose output is the output of the given accumulator obtained with the input provided by the original generator. This kind of composition is particularly useful in constructing a framework for pricing instruments (represented by accumulators) whose values depend on input (representing risk factors) generated by a generator participating in the composition.

```
GLAcc<X, Y> acc= . . . ; // any valid initialization

GLGen<X> gen1= . . . ; // any valid initialization

GLGen<Y> gen2=acc << gen1;
```

Single-Step Scenario-Generation and Simulation Framework

To demonstrate how generators and maps can be used effectively in practice, consider a simple, but relevant, application from the field of risk management—simulating a portfolio of financial instruments over a set of scenarios at a single future point in time. In particular, the example shows how the concepts discussed herein make it possible to build flexible software components readily for single-step portfolio simulation.

First, a generator is constructed that produces risk factor scenarios according to any one of several possible sampling models. Then, this scenario generator is composed with various pricing maps to construct three separate pricing generators: one for an individual financial instrument, another for a set of financial instruments and, finally, one for the total value of a portfolio.

The resulting pricing generators can, in turn, be used by various other applications that require this simulation functionality.

The simulation is based on the well-known scenario-generation model that assumes that the risk factors' log returns are joint normally distributed. Under this model, the levels of the risk factors x at a future time t are given by the formula $$x = x^0 \cdot \exp(A\sqrt{dt}\xi) \quad (1)$$

where $x^0$ is the vector of risk factors levels at the current time $t_0$, A is the square root of the covariance matrix of risk factors returns $\Sigma$ (i.e., $\Sigma = AA^T$), $dt = t - t_0$ is the time step and $\xi$ is a random vector having a multivariate standard normal distribution. Note also that the exponential function and products of vectors in Equation 1 are assumed to be component-wise operations on vectors.

According to Equation 1, the vector $x^n$, which represents the nth scenario, can be calculated as $$x^n = x^0 \cdot \exp(A\sqrt{dt}\xi^n), \quad (2)$$

where $\xi^n$ is a sample from the multivariate standard normal distribution. To calculate these scenarios, a generator of normally distributed vectors $\xi^n$ can be used.

In addition to the traditional approach, there are also techniques that aim to reduce the number of scenarios without affecting the statistical quality of the resulting data.

One such technique uses so-called quasi-random, low-discrepancy vector sequences from the multidimensional unit cube, for example, Sobol points. Applied to the model given by Equation 2, it suggests generating the vectors $\xi^n$ by applying the inverse normal distribution function $\Phi^{-1}$ to the elements $\delta^n$ of a quasi-random sequence: $\xi^n = \Phi^{-1}(\delta^n)$ on a component-wise basis.

Another well-known technique replaces the pseudo-random sequence $\{\xi^n\}$ with a specially constructed discrete approximation to the multivariate normal distribution given by a finite weighted sequence $(\xi^1, w^1), (\xi^2, w^2), \ldots, (\xi^k, w^k)$.

Figure 12:
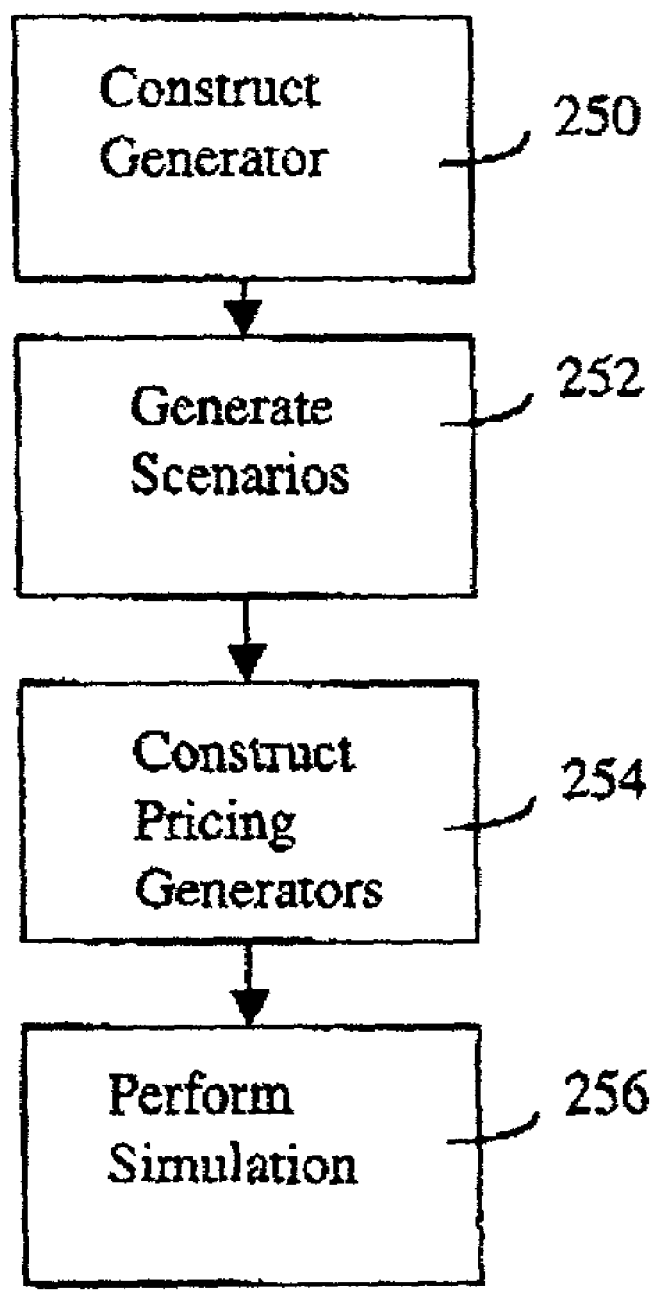
FIG. 12 illustrates steps in a method of simulating a portfolio of financial instruments over a set of scenarios at a single future point in time.

The three versions of the log-return model described above can be referred to as pseudo-random sampling, low discrepancy sampling and stratified sampling models, respectively. In the following sections, a portfolio-simulation tool that provides the option to choose any one of the three sampling models is described. A method of simulating a portfolio of financial instruments over a set of scenarios at a single future point in time is illustrated with reference to FIG. 12.

Step 1. Generalized Normal Generator

At step 250, a generator is constructed. Formally, the difference between the three sampling schemes described above is in the way the random vector component $\xi^n$ is calculated in Equation 2. Since $\xi^n$ may be a sample from the multivariate standard normal distribution N(O,I), part of a special discrete approximation of the distribution N(O,I), or an inverse normal mapping of a quasi-random vector from the unit cube, the sequence $\{\xi^n\}$ is referred to as a generalized normal sequence.

The first step is to create a constructing function that returns a generator of the generalized normal sequence, such as that shown in FIG. 13 as 260. The object iface, passed as a parameter to the function, provides a user interface for choosing a sampling scheme and specifying the data necessary to create a generator. Once a selection has been made, the required generator is created and returned from the function.

For the case of pseudo-random sampling, the glMultivarStNormalSampleGen constructing function (Block B of FIG. 9) is used. For the case of low-discrepancy sequences, the glMultivarSampleFromCdfGen constructing pattern (Block B of FIG. 11) is used. Finally, for the case of stratified sampling, the distributed generator glMultivarJamshidianDistribGen described above under the heading of "Distribution generators" is used.

Step 2. Generator of Scenarios

Referring again to FIG. 12, at step 252, scenarios are generated. Using getGeneralizedNormalGen, it is easy to implement the constructing function for a generator of scenarios (i.e., producing elements $x^n$ according to Equation 2). Indeed, Equation 2 implies that the sequence $x^1, x^2, \ldots$ can be obtained by applying the map $$m(\xi) = \exp(A\sqrt{dt}\xi) \quad (3)$$

to each element of the sequence $\xi^1, \xi^2, \ldots$. Thus, the required generator can be constructed as the composition of the corresponding map and the generalized normal generator.

An example of an appropriate constructing function is implemented in FIG. 14, and is shown as 270. In this function, glFromFuncPointerMap creates a scalar map from the standard C-library exponential function, which is then converted into a vector map by glExtensionToVectorMap that has already been used in Block B of FIG. 11. Component-wise multiplication of this result with the vector $x_0$ produces the vector map $m_1$, where $m_1(x) = x_0 \exp(x)$. This is then composed with $m_2(x) = A\sqrt{dt}x$, created by glLinearMap, to obtain a map corresponding to Equation 3. Finally the resulting map is composed with the generalized normal generator returned by getGeneralizedNormalGen.

Step 3. Pricing Generators

Referring again to FIG. 12, at step 254, having obtained a generator of scenarios, a variety of pricing generators can now be constructed.

Pricing Generator for an Instrument

Consider a financial instrument whose price depends on the risk factor levels (i.e., the scenario) at time $t = t_0 + dt$. A pricing function for this instrument can be represented by a map-object pr_map which maps vectors of risk factors to the prices of the instrument. In this case, pr_map is called a single-step pricing map.

It is easy to see that a pricing generator for the instrument can be obtained by composing pr_map with a scenario generator sc_gen: pr_map<<sc_gen. This leads to the extremely simple implementation of the constructing function for the pricing generator given in Block A of FIG. 15 shown as 280. Note that getInstrumentSimulationGen does not depend on the scenario-generation model actually chosen; any scenario generator can be passed as a parameter to the constructing function to produce a corresponding pricing generator.

Pricing Generator for a Set of Instruments

Suppose that the pricing maps of a portfolio of instruments are stored in the array pr_map_arr. A single vector pricing map for all instruments in the portfolio can be constructed by applying the GLScalarMergeMap operation to pr_map_arr, as described previously. This allows for an easy implementation of a constructing function that creates a simulator for the entire set of instruments in the portfolio (Block B of FIG. 15 shown as 282).

Pricing Generator for a Portfolio

Given a set of instrument positions, the total portfolio value is found by simply multiplying each instrument's value by its position size and then summing over all instruments. A constructing function that creates a pricing generator for the whole portfolio can be implemented as shown in Block C of FIG. 15 shown as 284.

The function product in Block C of FIG. 15 (284) creates a pricing map for the whole portfolio by calculating the inner product of the position vector and the vector of instrument prices returned by the GLScalarMergeMap map. The result is then composed with a generator of scenarios that is passed as a parameter to getPortfolioSimulationGen.

Step 4. Simulation

Referring again to FIG. 12, Steps 2 (shown as 252) and 3 (shown as 254) provide the tools for scenario generation and pricing. At step 256, the actual simulation can be performed in order to obtain Mark-to-Future data for a set of instruments.

Suppose that some application component interacts with the user in order to select a scenario-generation model and a portfolio of instruments that is to be simulated. Given the specified information, it calls the functions defined in Steps 2 (252 in FIG. 12) and 3 (254 in FIG. 12) to create a pricing generator pr_gen for the portfolio instruments (Block A of FIG. 16 shown as 290).

The pricing generator pr_gen can now be passed to the application component that performs the actual simulation. This component can then populate a Mark-to-Future table using a simple code similar to the one given in Block B of FIG. 16 shown as 292.

Multi-Step Scenario-Generation and Simulation Framework

The above framework can be extended to include situations where the evolution of risk factors, instrument values and portfolios occurs over many points in time.

In the multi-period setting, each scenario consists of a sequence of risk factor values, where each element of the sequence represents the values of the risk factors at the corresponding point in time. Such scenarios are produced by stochastic sequence generators, described earlier. Pricing instruments at a given time point in the mult-period setting requires computations involving the values of market variables at the time points prior to the given time point. Accumulators offer the capability necessary for this task. Therefore, in the multi-period setting, the pricing accumulators play a role analogous to that of the pricing maps in the single-period setting.

Figure 17:
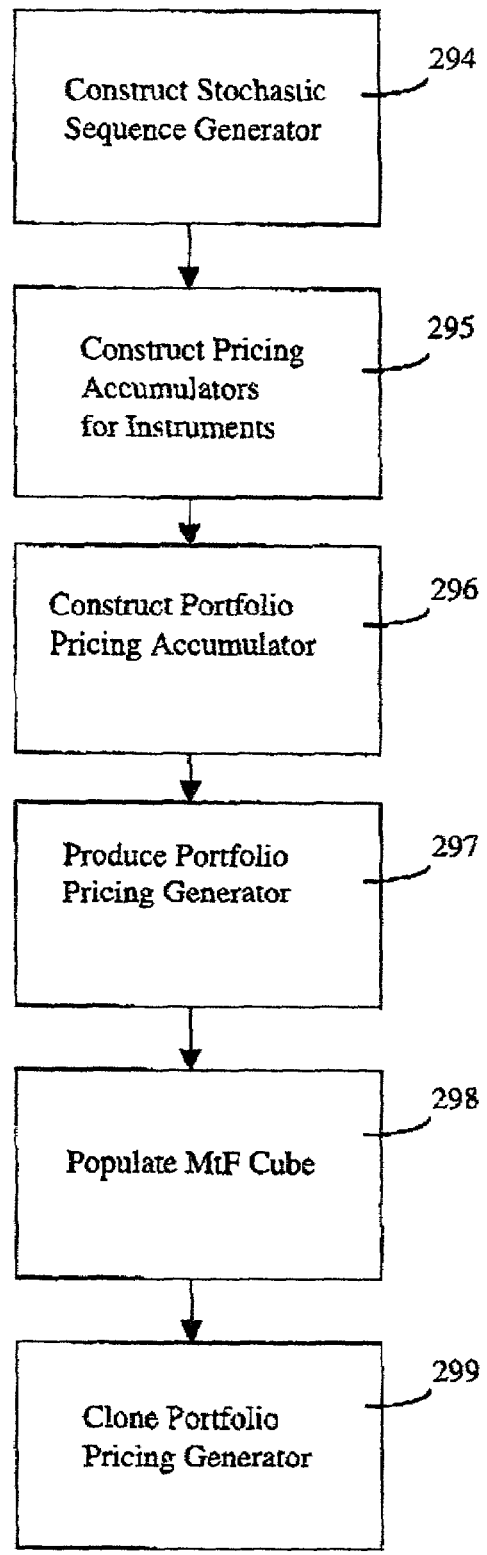
FIG. 17 illustrates steps in a method of simulating a portfolio of financial instruments over a set of scenarios over multiple points in time.

Referring to FIG. 17, a flowchart illustrating the steps in a method of simulating a portfolio of financial instruments over a set of scenarios over multiple points in time in an embodiment of the present invention is shown.

At step 294, a stochastic sequence generator suitable for the problem at hand is constructed. For instance, a stochastic sequence generator obtained from glGBMStochSeqGen will produce a scenario from the Geometric Brownian Motion model.

At step 295, pricing accumulators are constructed for all instruments in the portfolio. For instance, if the portfolio contains a swaption, a pricing accumulator is constructed using the function glSwaptionPrAcc described earlier.

At step 296, a suitable pricing accumulator for the entire portfolio at hand it constructed. This is accomplished by combining the pricing accumulator for individual instruments through the algebra of operations defined for accumulators into a composite pricing accumulator for the entire portfolio.

At step 297, the portfolio pricing accumulator is composed, using the composition operation, with the stochastic sequence generator constructed at step 294 to produce a portfolio pricing generator.

At step 298, using the common generator interface, the values of the portfolio at consecutive time steps are obtained by simulation and used to populate a region in the MtF cube which represents the current scenario.

At step 299, to populate the regions of the MtF cube representing the remaining scenarios, the portfolio pricing generator is cloned using, for example, generators of generators as described earlier, or any other method which produces a statistically identical and independent portfolio pricing generator.

EXAMPLE

Figure 18:
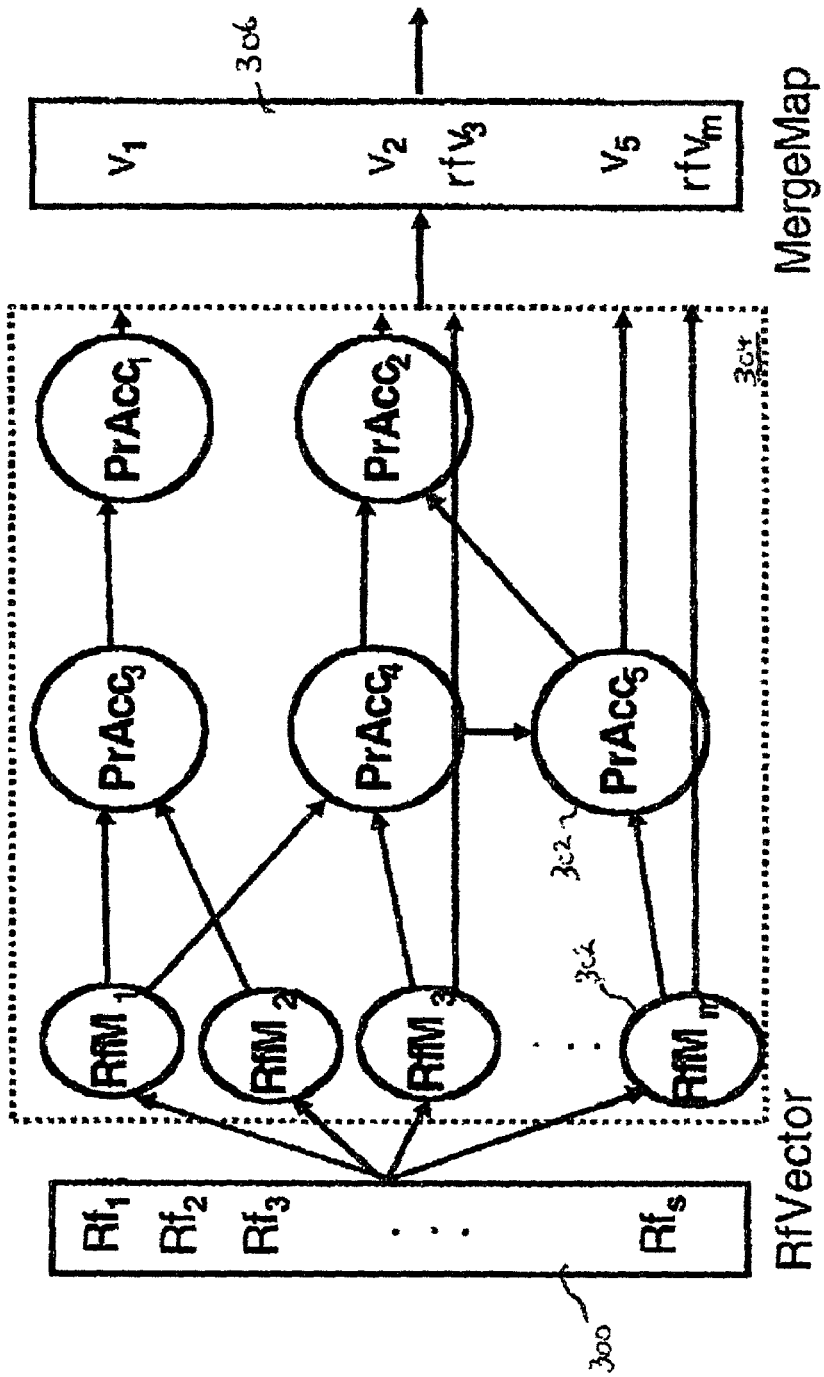
FIG. 18 is a schematic diagram that illustrates an application of the pricing framework in an embodiment of the present invention, to a risk-management problem.

As an example, FIG. 18 illustrates an application of the portfolio pricing generator for a simple risk-management problem. The rectangular object, shown as 300, on the left depicts a stochastic sequence generator, which produces a sequence of vector of risk factors Rf1, Rf2, . . . , Rfs. (For example, the components could be the interest rates at different terms, followed by the exchange rates of a number of currencies.) The circular objects 302 occupying the dashed rectangle 304 in the middle are accumulators representing various market variables. The inward-pointing arrows depict the flow of input values to the accumulator 302, while the outward-pointing arrows signify the flow of the output values from the accumulator 302. The accumulators RfM1 to RfMm simply collect the values of risk factors. The accumulators PrAcc1 to PrAcc5 correspond to financial instruments (e.g., bonds, interest or currency swaps) dependent on some or all of the underlying risk factors, or instruments dependent on some risk factors and some of the other instruments (e.g., interest rate swaptions). The values of the risk factors and the instruments are examples of market variables. The rectangular object on the right shown as 306 represents a map, which combines the values of the instruments into one vector. The network contained within the dashed region 304, composed with the map 306 on the right is a composite pricing accumulator, obtaining a vector of risk factors and returning a vector of market variables (in this case, instrument price values). This composite pricing accumulator, when composed with the scenario generator 300 on the left, produces a pricing generator which can be used to carry out a Monte Carlo simulation producing one scenario of the prices of the modeled instruments. The procedure is repeated with statistically identical and independent pricing generators to obtain as many scenarios as required.

Other Remarks

As shown in the example, using generators and generator operations allows, with only a few lines of code, for the definition of a generator of scenarios and also of pricing generators for a single instrument, for all instruments in the portfolio and for the total value of the portfolio. Similarly, obtaining the actual simulation results generally requires minimal coding effort.

It is important to note how the organization of the code ensures a clear separation between the process of constructing generators and their subsequent usage. The scenario generator or a pricing generator can be passed to a software component that requires its data. This component does not need to know anything about the nature of the generated values; it simply uses the common generator interface to obtain the required data. This separation enables the extension of the scenario-generation and simulation tools without the need for modifying the software components that actually exploit them.

The present invention has been described with regard to specific embodiments. However, it will be obvious to persons skilled in the art that a number of variants and modifications can be made without departing from the scope and spirit of the invention defined in the claims appended hereto.

The invention claimed is:

1. A system for use in developing risk management software, said system comprising an object-oriented library of library objects stored on a computer-readable storage medium, said library comprising:
    (a) a first plurality of library objects for use in generating scenarios data, comprising a plurality of generators passable to at least one software component that requires data provided by said generators, wherein each of said plurality of generators produces elements of a sequence governed by a sequential process, wherein each generator comprises a common generator interface, where said common generator interface comprises a first function that generates the next element of said sequence and a second function that returns the element most recently generated by said first function;
    (b) a second plurality of library objects for calculating instrument values, comprising at least one of
        i. a plurality of maps, wherein each map comprises a common map interface, wherein said common map interface comprises a third function that receives as input a first object of a first type, transforms said first object according to a pre-defined rule to produce a second object of a second type, and returns said second object, and
        ii. a plurality of accumulators, wherein each accumulator comprises an internal state and a common accumulator interface, said internal state having a current value, said current value being a function of one or more past values of said internal state and one or more data values received as input by said accumulator, said common accumulator interface comprising a fourth function to receive as input said one or more data values and to update said internal state to a new current value, and a fifth function that returns a value corresponding to the current value of the internal state; and
    (c) a third plurality of library objects comprising a plurality of operations, said plurality of operations defined to operate on at least one generator of said plurality of generators and at least one other operand in an expression to produce a new generator;
    said new generator for use in performing a simulation to obtain prices for a plurality of instruments over a plurality of scenarios.

2. The system as claimed in claim 1, wherein each generator is adapted to produce elements of either a deterministic or stochastic sequence.

3. The system as claimed in claim 1, wherein said other operand is selected from the following group: a generator; a map; an accumulator; and objects of compatible type such that said arithmetic expression is defined.

4. The system as claimed in claim 1, wherein said expression is an arithmetic expression comprising one or more of the arithmetic operations selected from the following group: addition, subtraction, multiplication, and division.

5. The system as claimed in claim 1, wherein said expression comprises a composition operation.

6. A method of developing risk management software using objects from an object-oriented library, said software comprising instructions for simulating a portfolio of financial instruments over a plurality of scenarios, said method comprising the steps of:
    (a) constructing a scenario generator passable to at least one software component that requires data provided by said scenario generator, wherein said scenario generator produces elements of a sequence governed by a sequential process, wherein said scenario generator comprises a common generator interface, and wherein said common generator interface comprises a first function that generates the next element of said sequence and a second function that returns the element most recently generated by said first function;
    (b) constructing one or more pricing maps, wherein each pricing map is associated with an instrument in a portfolio, wherein each pricing map comprises a common map interface, wherein said common map interface comprises a third function that receives as input a first object of a first type, transforms said first object according to a pre-defined rule to produce a second object of a second type, and returns said object;
    (c) composing said one or more pricing maps with said scenario generator to obtain a pricing generator; and
    (d) using said pricing generator in performing a simulation to obtain prices for a plurality of instruments.

7. The method as claimed in claim 6, wherein step (c) comprises the steps of composing said one or more pricing maps to produce a composite pricing map, and composing said composite pricing map with said scenario generator to obtain a pricing generator.

8. The method as claimed in claim 6, wherein said prices for said plurality of instruments are used to populate a Mark-to-Future cube.

9. A method of developing risk management software using objects from an object-oriented library, said software comprising instructions for simulating a portfolio of financial instruments over a plurality of scenarios, said method comprising the steps of:
    (a) constructing a stochastic sequence generator passable to at least one software component that requires data provided by said scenario generator, wherein said stochastic sequence generator produces elements of a sequence governed by a sequential process, wherein said stochastic sequence generator comprises a common generator interface, where said common generator interface comprises a first function that generates the next element of said sequence and a second function that returns the element most recently generated by said first function;
    (b) constructing one or more pricing accumulators, wherein each pricing accumulator is associated with an instrument in a portfolio, wherein each pricing accumulator comprises an internal state and a common accumulator interface, said internal state having a current value, said current value being a function of one or more past values of said internal state and one or more data values received as input by said accumulator, said common accumulator interface comprising a third function to receive as input said one or more data values and to update said internal state to a new current value, and a fourth function that returns a value corresponding to the current value of the internal state;
(c) composing said one or more pricing accumulators with said stochastic sequence generator to obtain a pricing generator;
(d) using said pricing generator in performing a simulation to obtain prices for a plurality of instruments at each time step in a scenario; and
(e) repeating step (d) over a plurality of scenarios.

10. The method as claimed in claim 9, wherein step (c) comprises the steps of composing said one or more pricing accumulators to produce a composite pricing accumulator, and composing said composite pricing accumulator with said stochastic sequence generator to obtain a pricing generator.

11. The method as claimed in claim 9, wherein said prices for said plurality of instruments are used to populate a Mark-to-Future cube.

12. The method as claimed in claim 9, wherein step (e) is performed by cloning said pricing generator.

* * * * *

UNITED STATES PATENT AND TRADEMARK OFFICE
CERTIFICATE OF CORRECTION

PATENT NO. : 7,392,213 B2
APPLICATION NO. : 10/084650
DATED : June 24, 2008
INVENTOR(S) : Merkoulovitch et al.

It is certified that error appears in the above-identified patent and that said Letters Patent is hereby corrected as shown below:

In the Claims:

Column 26, line 32, replace "returns said object" with -- returns said second object --, and Column 26, line 52, replace "said scenario generator" with -- said scenario stochastic sequence generator. --

Signed and Sealed this
Seventeenth Day of December, 2013

Margaret A. Focarino
*Commissioner for Patents of the United States Patent and Trademark Office*